US010990418B1

(12) United States Patent
Wallace

(10) Patent No.: US 10,990,418 B1
(45) Date of Patent: Apr. 27, 2021

(54) SYSTEM AND METHOD FOR PROVIDING APPLIANCE OPERATION INSTRUCTIONS AND DATA ENTRY DURING THE PREPARATION OF A RECIPE

(71) Applicant: Perfect Company, Inc., Vancouver, WA (US)

(72) Inventor: Michael Wayne Wallace, Vancouver, WA (US)

(73) Assignee: PERFECT COMPANY, Vancouver, WA (US)

( * ) Notice: Subject to any disclaimer, the term of this patent is extended or adjusted under 35 U.S.C. 154(b) by 299 days.

(21) Appl. No.: 15/844,302

(22) Filed: Dec. 15, 2017

(51) Int. Cl.
*G06F 9/451* (2018.01)

(52) U.S. Cl.
CPC .............. *G06F 9/451* (2018.02); *G06F 9/453* (2018.02)

(58) Field of Classification Search
CPC .......... G06F 9/451; G06F 9/453; G05B 15/02
See application file for complete search history.

(56) References Cited

U.S. PATENT DOCUMENTS

| 8,829,365 | B1 | 9/2014 | Wallace et al. |
| 2014/0318874 | A1 | 10/2014 | Moses et al. |
| 2018/0165620 | A1 | 6/2018 | Ross et al. |

*Primary Examiner* — Timothy A Musselman
(74) *Attorney, Agent, or Firm* — Rylander & Associates, PC; Philip R. M. Hunt

(57) ABSTRACT

A system and method directed to the guided processing of recipes distributed by a server to a local store environment is described. A recipe may include at least two ingredients and recipe actions. A computing device may include a recipe processing application that generates a display on a user interface. The display including data associated with one or more portions of or a full control panel of an appliance (or multiple appliances) that processes the recipes is provided. The associated data presented on the user interfaces may or may not be operable to receive data in the same manner as the control panel on the appliance(s).

16 Claims, 11 Drawing Sheets

FIG. 4B

| 420 APPLIANCE NAME | 422 TYPE | 424 APPLIANCE CONTROL PANEL IMAGE | 430 IMAGE | 432 PRESELECTED | 434 UI CONTROL PANEL OPERABILITY | 436 OPERATIONS | 438 DESCRIPTION |
|---|---|---|---|---|---|---|---|
| PERFECT COMPANY COMMERCIAL COMBINATION APPLIANCE | SCALE AND BLENDER | | | ✓ | OPERABLE | OPERATION OF SCALE AND BLENDER | COMBINATION APPLIANCE, INCLUDING SCALE AND BLENDER |
| PERFECT COMPANY COMMERCIAL SCALE | SCALE | | | | INSTRUCTION ONLY | OPERATION OF SCALE | SCALE WITH SELECTION OF ACTUAL WEIGHT MEASUREMENT OR TARGET |
| VITAMIX 780 BLACK HOME BLENDER | BLENDER | | | ✓ | OPERABLE | OPERATION OF BLENDER | BLENDER WITH DIGITAL CONTROL PANEL |

(402)

301 APPLIANCE CONTROL PANEL MODULE
- PROCESSOR
  - RECIPE MODULE
  - ACTION MODULE
  - APPLIANCE MODULE
- ELECTRONIC STORAGE

SYSTEM AND METHOD FOR PROVIDING APPLIANCE OPERATION INSTRUCTIONS AND DATA ENTRY DURING THE PREPARATION OF A RECIPE

BACKGROUND

One common method of preparing foodstuffs is to utilize recipes. Each recipe may include a list of ingredients and actions for executing the recipe. The actions may be based on the recipe ingredients and instructions for processing the ingredients. For example, after adding the ingredients to a container in which they will be processed, the instructions may further detail the processing, such as mixing, blending, frying, sautéing, baking, or similar. The processing may include one or more appliances. Generally, a person preparing the foodstuff (or executing a recipe, hereinafter referred to as a user), measures and adds one or more ingredients to a mixing container and, where applicable, identifies an appliance that may be used to process the ingredients. The selection and operation of the appliance may impact the quality of the foodstuff. For example, in the case of a recipe for a blended beverage (such as a protein shake or a frozen coffee beverage), the selection and operation of a blender with which to process the blended beverage may impact the quality of the beverage.

Generally, the execution of recipes in a commercial setting adds complexity to preparing foodstuffs. There may be a variety of recipes, with each recipe being prepared in multiple serving sizes. The recipe instructions also may differ as a function of the selected serving size. A user may prepare a recipe repeatedly with different serving sizes. A user similarly may prepare multiple unique recipes, with each recipe once again being executed with different serving sizes. A commercial setting may have advertised or expected characteristics of the recipes as processed, for example, a given density, consistency, thickness or ingredient integration for a blended beverage or individual ingredients, such as crushed ice, or similar. These characteristics may require consistent execution by users, supported by additional guidance in the selection and/or operation of appliances.

Appliance operation also may have competing characteristics from the standpoint of foodstuff preparation. On the one hand, a basic blender with simple data entry for operation, such as start and stop buttons and several blender push-button modes (such as, for example, stir, chop, mix, puree, liquefy, pulse mode, crushed ice, or similar) may offer limited button operations. However, they may be inadequate on a more sophisticated operational level as may be needed in a commercial setting in order to rapidly and repeatedly prepare foodstuffs with varying serving sizes and pre-advertised features (such as density, thickness or consistency of ingredient integration, or similar). On the other hand, more sophisticated blenders with a variety of control panel options, multiple operational steps and/or multiple phases of operation (such as, for example, pulsing with or without push-button modes, or altering blender speeds and time periods per phase) may produce a more precise and sophisticated variety of beverages in a commercial setting, yet be more difficult for the user to execute. As a result, there is a need to improve the optimal selection and operation of appliances for foodstuffs, with an attendant reduction in the complexity required of the user in a commercial setting.

In some commercial settings, therefore, users may be provided with training or additional actions or instructions in preparing recipes. Examples of additional training are visual depictions or written instructions that are in greater detail than traditional recipe instructions, as well as photos, audio or videos related to appliances used to process recipe ingredients, or similar. However, this additional guidance may be limited in that it may not take into account the specific selection of appliances, one or more portions of the control panels for the appliances and/or data entry options on the one or more portions of the control panels for the appliances, or similar. There is a need to provide additional guidance to users in foodstuff preparation which takes into account the specific selection of appliances, one or more portions of the control panels for the appliances and/or data entry options on the one or more portions of the control panels for the appliances, or similar. There is a further need to provide guidance to users in the selection of appliances for the repetitious preparation of recipes with different serving sizes, particularly in a commercial setting.

BRIEF DESCRIPTION OF THE DRAWINGS

FIG. 4A-4B depict illustrative data structures showing data flows among various data sets associated with the systems and methods for processing and providing feedback for recipes using recipe processing app, as well as distributing recipes on the platform.

Figure 1:
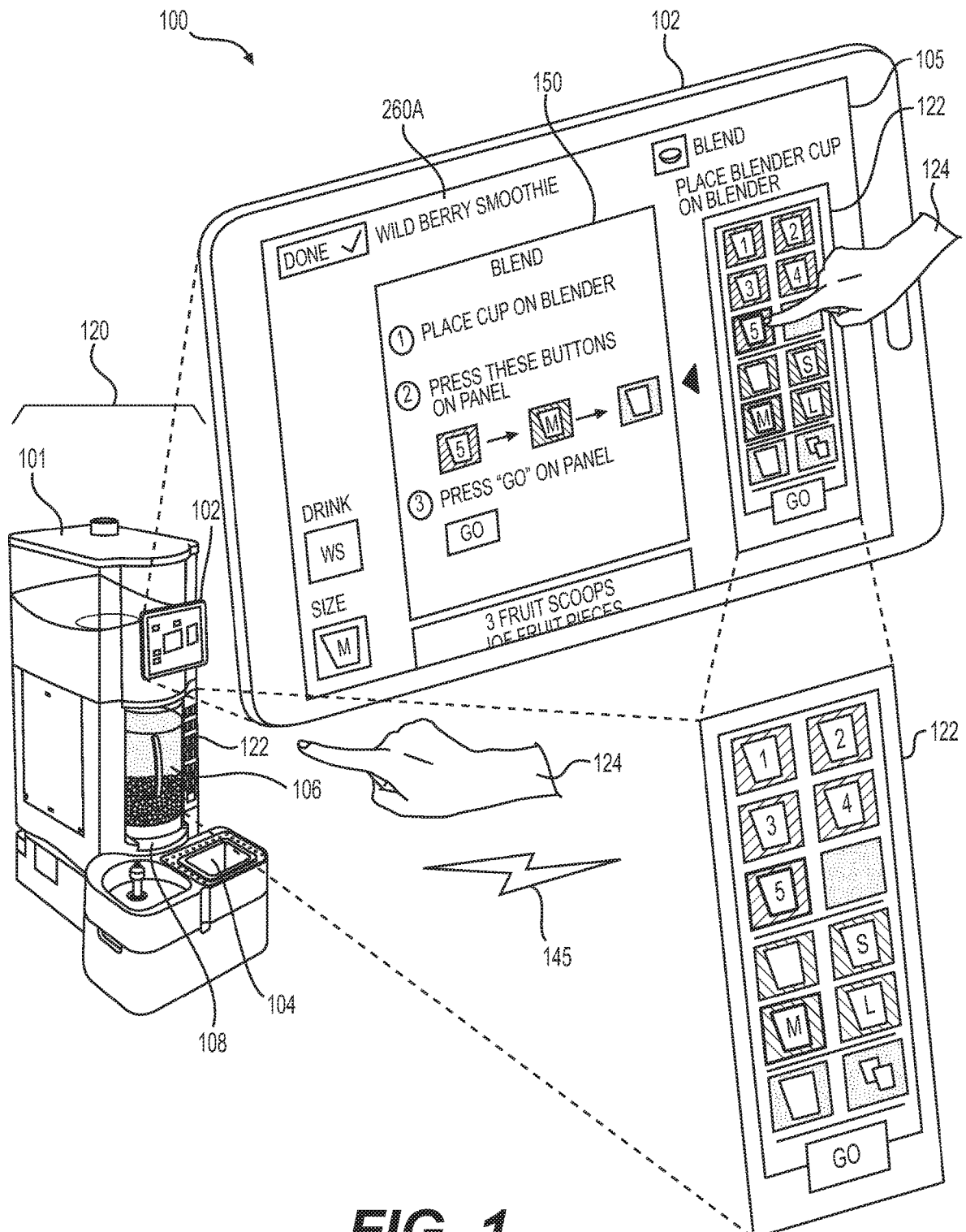
FIG. 1 is a schematic diagram of an illustrative computing environment of systems and methods usable to provide an appliance and a computing device for processing a recipe.

While implementations are described herein by way of example, those skilled in the art will recognize that the implementations are not limited to the examples or drawings described. The drawings and detailed description thereto are not intended to limit implementations to the particular form disclosed but, on the contrary, the intention is to cover all modifications, equivalents and alternatives falling within the spirit and scope as defined by the appended claims.

When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. In addition, the use of directional terms such as "upper," "lower," "above," "underneath" or similar, are intended to describe the positions and/or orientations of various components of the invention relative to one another as shown in the various figures and are not intended to impose limitations on any position and/or orientation of any embodiment of the invention relative to any reference point external to the reference.

DETAILED DESCRIPTION

This disclosure is generally directed to systems and methods for preparing foodstuffs from recipes with improved guidance for user(s) in operating one or more appliances to process recipe ingredients, particularly as applied in a commercial setting with multiple recipes and multiple serving sizes per recipe. The systems and methods of the present disclosure receive a recipe from a server, with the recipe including at least two ingredients and one or more recipe actions. The systems and methods of the present disclosure further provide feedback to guide a user in accurately processing the recipe ingredients.

In one example of the present systems and methods, the use of a blender appliance for executing a recipe may involve a complex sequence of blender operations. Examples of specific blender operations may comprise a specific power level; a specific rotation speed; and/or a specific duration; or similar. A recipe processing application (app) may be capable of interacting with a blender. The recipe processing app may also be capable of controlling the operation of the blender appliance. The recipe processing app may further be capable of this control based on a remote connection to the appliance through a network. The recipe processing app may further receive data to control the blending appliance.

One approach for generating the data to control the blender appliance is that the recipe processing app receives operating code for a sequence of blender operations. The operating code may be stored as part of the recipe, at a central source environment, at a local store environment, at the appliance such as the blender appliance to be operated and/or at another storage source. Another approach for generating the data to control the blender appliance is that the recipe processing app or another application may be capable of recording the operation of a blender appliance, including sensing one or more of the power, speed and/or duration of one or a sequence of blender operations. More particularly, in one example, the operating code to control the operation of the blender appliance may be generated based on a sample operation of the blender appliance that is recorded, duplicated or otherwise replicated, or similar. The recorded sequence may be stored as metadata associated with a recipe in a permanent or temporary storage. When a recipe with a recorded sequence is executed by a user, the sequence may be converted into manual operations. The user may then be presented with a specific list of blender operations to perform manually. As an alternative, when a recipe with a recorded sequence is executed by a user, the recipe processing app may remotely control the blender appliance to replicate a portion or all of the recorded sequence of blender operations. Then, all or a portion of the operating code may be stored either in a central source environment or a local store environment, including by the recipe processing app as part of a local store environment, for use by the recipe processing app for controlling the blender appliance. In another example, an employee may record the operation of a blender appliance in a central environment, generate at least a portion of operating code and associate one or both of the identification of the blender appliance and the operating code for the blender appliance with the recipe.

In other examples, operating code for the blender appliance may be transmitted to the local store environment separately. It may thereafter be accessed based on an identification and/or a selection of the appliance during recipe execution. Based on the identification and/or the selection of the appliance, all or a portion of the operating code for the appliance may be acquired from a storage source provided by the appliance manufacturer, a third party resource, a public resource, or similar. In still further examples, the blender appliance identification may be sufficient to trigger an automated program that is preset and stored in a storage source in the application or accessible by the appliance. In this case, the recipe processing app may provide an identification of the appliance or the app may provide a data entry option for the user to enter a selection of the appliance. In yet another example, the recipe processing app may connect through a network and establish a communication link with one or more appliance(s). This communication link may be another basis for the identification and detection of one or more appliance(s) by the recipe processing app. Once detected, the communication link may enable the receipt by the recipe processing app of more data about the operation of the appliance(s).

In additional examples, the data and metadata for a recipe may include data regarding optimal, minimum and maximum characteristics of appliance operations, such as for a blender for individual and a sequence of operations. A sequence of operations may be presented in combination or in parallel (such as, where one action may be executed during a time period for the completion of another separate action). The characteristics of one or more blender operations may be dependent on the total weight of a recipe mixture, the size and shape of a blender container, the specific nature of ingredients including substitute or discrete ingredients, and other factors related to the recipe or the appliance. In this way, the recipe processing app may be able to set parameters for operation of appliances based on features of recipes. These parameters may, therefore, enable the recipe processing app to generate more detailed instructions and/or operating code.

The accuracy of preparing recipes may be improved based on systems and methods that receive a recipe from a server, the recipe indicating at least two ingredients and at least one action to operate an appliance. In addition, a recipe processing app may generate a UI to display one or more indications of at least a portion of one or more data fields or other data associated with a control panel of the appliance. The display also may include at least one instruction to operate at least one appliance for processing the recipe. The display may further include a depiction of at least a portion of one or more data fields or other data of a control panel of the appliance used to process the recipe ingredients. In another example, the display may include a depiction of a full control panel of the appliance used to process the recipe ingredients.

The inclusion in a recipe of at least one action and/or one or more indications associated with at least one portion of one or more data fields or other data associated with the control panel of an application may be accomplished with a new data structure for a recipe. The new recipe data structure improves the functioning of the appliance by optimizing the sequence of operations of the appliance and providing additional guidance to the user to reduce operational errors. In addition, where one or more indications associated with the one or more data fields of the control panel on the display are operable to receive data entry, the user may interact with the display to operate the appliance. These interactions may be further guided based on the UI display including multiple instructions for data entry by the user. The instructions may guide the user in manual operations of the appliance, or in partially manual and partially automated operations. With operable data entry fields on the UI display provided as part of the new recipe data structure, the systems and methods of the present disclosure improve the operation of the blender appliance.

In another example, instructions to operate an appliance may be included in a recipe received from a server or a storage source within a local store environment, or a portion of the instructions may be included in a recipe and a portion may be stored in the local store environment. Examples of apportioned instructions are the following: the recipe includes an identification of the appliance and the instructions to operate the appliance are provided locally; an initial instruction is received from the server and updates are generated locally; or an initial instruction is received from the server, a portion of updates are provided locally and a portion is provided from the server. Where a portion or all of any updates to instructions are generated locally, the updates may be are then transmitted to the server, which may then prompt updates to the instructions being redistributed to additional local environments.

Furthermore, particularly in a commercial setting, the consistency and quality expected for recipes provided to consumers may demand strict adherence to precision in processing recipe ingredients. For example, a combination of multiple ingredients presented in a small serving size for a frozen beverage, if over blended (for example, to prematurely melt the frozen ingredients), may result in a larger number of fluid ounces than advertised for the beverage, causing the beverage to overflow from its container, or to have a watery consistency in contrast to expected quality standards. The overflow may cause the user to discard the beverage, causing waste and delay in the delivery of the foodstuff to the consumer. In some situations, certain health conditions may demand strict adherence to a prescribed consistency of processing, such as a thoroughly blended and processed beverage. These health conditions may convert merely an interest in the advertised characteristics of the foodstuff to become a requirement.

As used in this document, a "foodstuff" is any substance that may be consumed as food. A foodstuff may be a single raw item such as an apple or pear. A foodstuff may be a single raw item that has been processed or prepared in some manner, such as a hard-boiled egg. A foodstuff may be an aggregation of items prepared according to a recipe. The ingredients of a foodstuff may be liquids, solids, gels, suspensions, or combinations of such substances, or similar. A "discrete" foodstuff is one that can be presented based on one or more measurement unit(s) for measuring the ingredient, instead of or in addition to other measurement approaches, such as weight, volume, density, or similar. Examples of discrete ingredients are strawberry, grape, and Oreo™ cookie, each of which is typically added to a recipe in single indivisible units.

As used in this document, a "recipe" includes two or more ingredients, at least one of a compilation of one or more actions undertaken to prepare a foodstuff and/or one or more indications associated with one or more data fields associated with the control panel of an application. A recipe commonly lists ingredients, each of which may be associated with a quantity that may be specified with greater or lesser precision. Listing an ingredient in a recipe implies the step of measuring that ingredient. As used herein, a "recipe mixture" comprises two or more ingredients admixed together. A recipe may involve more than one recipe mixture, and two recipe mixtures may be admixed to create a further recipe mixture.

Successive activities associated with a recipe are herein termed "recipe actions," "recipe instructions" and/or "recipe steps." A recipe action, instruction or step may be, for example, the measurement of a quantity of a substance. Additional recipe actions, instructions or steps may include, for example, the identification of one or more ingredients to process in the recipe such as a first ingredient to measure, the next ingredient to process or measure, or similar. Actions performed to execute the recipe may include as follows: identify a container in which to place one or more ingredients; place the container on a scale; set the container aside; replace the container with another container; place one or more ingredients in a separate container; combine ingredients in separate containers; irreversibly mix ingredients together; physically alter one or a combination of ingredients through a process such as blending, sautéing, baking, or the like; mingle ingredients or sets of ingredients without admixture; place the container on or in an appliance; operate the appliance; enter one or more pieces of data to operate the appliance; take one or more actions to initiate operation of one or more appliances; monitor or change the operation of one or more appliance(s); perform a quality check of the foodstuff; remove the foodstuff from the appliance; place the foodstuff in a serving container; measure one or more properties of the foodstuff for another quality check; or similar. A recipe step may comprise manipulating a device preparatory to a further recipe step, for example, preheating an oven preparatory to baking an assemblage of recipe ingredients. A recipe step may comprise utilizing a device to perform an action upon one or more ingredients, such as baking a cake mix.

As used herein, the terms "execute," "executing," "execution," "combine," "combining," "prepare" and "preparing" refer to the successive completion of one or a sequence of recipe actions, instructions or steps comprising a recipe, or making a recipe or combining one or more ingredients as part of making a recipe.

As used herein, a "recipe block" is a graphical representation of a recipe ingredient (and, in some examples, the measurement of the ingredient), action, instruction and/or step, comprising a graphical user interface (GUI) element, being a sub-region (or alternatively, other portions of the display or another display) of the display area, defined by a boundary and rendered in a manner to distinguish it from the background and other sub-regions of the display. A recipe block may persistently show the state of completion of an associated recipe action, such as measuring an ingredient or processing recipe ingredients. A recipe block may be, as examples, a "recipe action block" or a "recipe ingredient block."

As used herein, a "recipe action block" is a graphical representation of a recipe action, instruction or step that may define an activity other than the measurement of an ingredient.

As used herein, a "recipe ingredient block" is a graphical representation of the type and amount of an ingredient to be measured for addition to a recipe mixture; a recipe ingredient block implies the act of measuring the associated ingredient and the recipe ingredient block may dynamically present the changes to one or more characteristic(s) of the ingredient in order to provide feedback to the user.

As used herein, an "active" or "activated" recipe block is one that is the current focus of activity in the execution of a recipe. In one example, a recipe may have at most one active recipe block at any moment. An active recipe block may be denoted by modifying the color, weight, or style of the border of the block, or may be denoted by modifying the size, position, or visual content of the recipe block, as well as other indications such as audio or video, as further described below, or similar. In other examples, a recipe may have multiple active recipe blocks being processed at any moment.

As used herein, the term "dead band" refers to a range of weights extending from a lower threshold weight that is lower than the desired target weight (as predetermined in a recipe) to an upper threshold weight that is greater than the desired target weight. Where a dead band is defined, any weight measurement that is greater than or equal to the lower threshold and less than or equal to the upper threshold may be, for one example, considered to be equivalent to the target weight. A dead band also may support the identification of a threshold amount relative to the desired target weight. A threshold amount may take a variety of forms, including for example, within 1%, 2%, 5%, 10%, 25% or 50% of the target amount (such as a predetermined weight, volume, density, or similar of an ingredient called for in a recipe). When a threshold is defined, any weight measurement is within the threshold amount of the target weight, may be considered to be equivalent to the target weight.

As used herein, the term "under pour" refers to the state where less than a target amount of an ingredient has been added to a recipe mixture. A user may elect to deliberately accept an under pour amount to replace the target amount of an ingredient.

As used herein, the term "over pour" refers to the state when more than a target amount of an ingredient has been added to a recipe mixture. A user may elect to deliberately accept an over pour amount to replace the target amount of an ingredient. As an alternative, a user may elect to remove a portion of the excess amount to correct the over pour condition. As a further alternative, a user may elect to scale a recipe to correct the weights of all other ingredients to be proportional to the amount of the over pour ingredient. As yet a further alternative, a user may elect to discard the recipe mixture containing the over pour and re-execute recipe steps as required.

As used herein, a "nutrient" is an edible substance that provides utility to the human body when consumed. A foodstuff may include one or more nutrients, each of which provides utility. Examples of nutrients include minerals such as zinc and manganese. Further examples of nutrients include vitamins, proteins, carbohydrates, fat, and sugars. The utility that a nutrient provides to the human body is termed herein its "nutritional value". As used herein, the term "nutrient" also includes calories. The caloric content of a foodstuff provides energy, but may or may not provide other nutritional value when consumed.

As used herein, "nutritional data" may be defined to include or to be equated with the variety of terms and phrases for conveying nutritional data about recipes, including nutritional information, nutrition information, nutrient data, nutrient amount, nutrition data, serving size, number of servings, amount per serving, portions, serving portions, or similar. Nutritional data also may include one or more nutrient amounts, such as an individual nutrient amount of weight or a combination of weight and calories. Examples of nutrient amounts are: a measurement of the number of calories, as well as a weight, a volume, a density, a size, a length, or a weight of a protein, a fat, carbohydrates, calories, dietary fiber, vitamins, minerals, fatty acid, sugar, or another indication of nutrition, or similar. Nutritional data further may be determined for an ingredient, two or more ingredients, a recipe, a number of servings or a serving size of a recipe. In addition, nutritional data or amount may include information relating to additional daily dietary recommendations such as those based on a recommended daily allowance (RDA).

As used herein, an "app" or "application" is an executable computer program running on a computing device and presenting a graphical user interface (GUI) on the display surface of the computing device.

As used herein, the term "real-time" refers to the speed of response of a computer measurement and display system. As used herein, the term "essentially real-time" or "approximately real-time" refers to the provision of feedback to the user with a sufficiently brief latency to allow a novice user to operate the system without difficulty, with minimal or no training. In practice, as one example, a latency of 0.1 seconds may allow a user to feel that a system is reacting instantaneously. In another example, these phrases may be used to indicate processing as quickly as is practicable, and/or as may be achieved within the capability of human interaction or responses in the utilization of the methods and systems. The processing also is impacted by the latency inherent with communication protocols, hardware limitations, and software execution.

As used herein, the pronoun "he" is intended to mean he or she, referring to a person irrespective of gender. Similarly, the possessive "his" is intended to mean his or hers, referring to a person irrespective of gender.

These characteristics of the methods and systems of the present disclosure improve the execution of recipes based upon improving the operation of one or more appliances that process the ingredients of the recipes, while reducing the need for extensive training. This approach is particularly applicable in commercial settings where repetition and constant changes in serving sizes heighten the chance of error due to fatigue or distraction and, thereby, increase the chance of foodstuff waste and unproductive time for employees. In addition, improving the precision of ingredient processing increases the quality of the overall foodstuff as it is served to the consumer. Where there is a sequence of processing steps in operating an appliance, the precision execution of each processing step increases the accuracy of subsequent processing, and thereby builds quality into each processing step.

More particularly, following the addition of recipe ingredients to one or more containers, subsequent recipe actions may provide an additional guided experience for the user in order to process the ingredients. The guided experience enables the user to focus his/her attention on the precise activities, including for example relocating the container in which the ingredients are mixed to an appliance that is then operated to process the ingredients. Additional guided instructions may include indicating a location on an appliance in which to insert a container for processing. For example, where a blender is used, and the container is a blender container with a particular configuration for inserting the blender container onto the blender, an action may include a visual depiction of the actual blender container and the blender appliance location in which to place the blender container, as well as any details which may support the movement. For example, details may include information about an insertion point and any insights about difficulties in properly orienting the blender container. In additional examples, such as where multiple functionalities are integrated into a combination appliance, additional guidance may include an indication that the activity entails movement of the container from one portion of the appliance to another portion of the appliance. Where additional or independent steps are involved, such as adding a garnish, recipe actions may also include the activity of preparing the garnish and/or moving the recipe admixture into a serving container for the addition of the garnish, or similar.

The systems and methods of the present disclosure may be enabled by a smart scale (as another example of an appliance) that is calibrated to weigh one or more ingredient(s) as they are added to a container in which they then will be processed by one or more appliance(s). The use of a precision scale to support an accurate and comprehensive assessment of each ingredient as it is added to the container in which the ingredients are combined, improves the accuracy of the ingredient quantities according to the predetermined portions outlined in the recipe. Also, the methods and systems of the present disclosure may utilize the smart scale to provide feedback about specific ingredients. With precision detection of an actual weight measurement of an ingredient, feedback may include monitoring the accurate addition of each ingredient within a predetermined target weight dead band or within a threshold amount of the predetermined target weight. Alternatively, the feedback also may include a comparison between an actual ingredient weight measurement received in the container during execution and the target ingredient weight stipulated in the recipe. The comparison supports providing improved accuracy in the execution of the recipe.

In addition, where adjustments to ingredients or the recipe are warranted, the systems and methods may provide adjustment options for the user or an automated approach to adjust the ingredient(s) and/or the total recipe(s) for correction. For example, the scale may provide data including an actual ingredient weight measurement as well as the target ingredient weight measurement. In one example, the user may override an under pour or an over pour when the ingredient as weighed is within a threshold amount of the predetermined target amount even if it is outside of the target dead band. One example of an adjustment option is for the recipe processing app to select an actual ingredient weight measurement or the target ingredient weight for a subject ingredient. In another example, the recipe processing app may support the user to select either the actual ingredient weight measurement (i.e., "actual") or the target ingredient weight (i.e., "target") where these values are different but the actual is within the threshold amount of the target, based on data entry options on a UI. In this way, the actual ingredient weight measurement may be used for the calculation of further nutritional data for the recipe. In an additional example of adjustment options, the systems and methods also may include changing the number of servings of the foodstuff, such as, for example, increasing the target weight of one or more ingredients, such as the next ingredient(s) to be added, in order to produce two servings versus a single serving, or similar.

Figure 2:
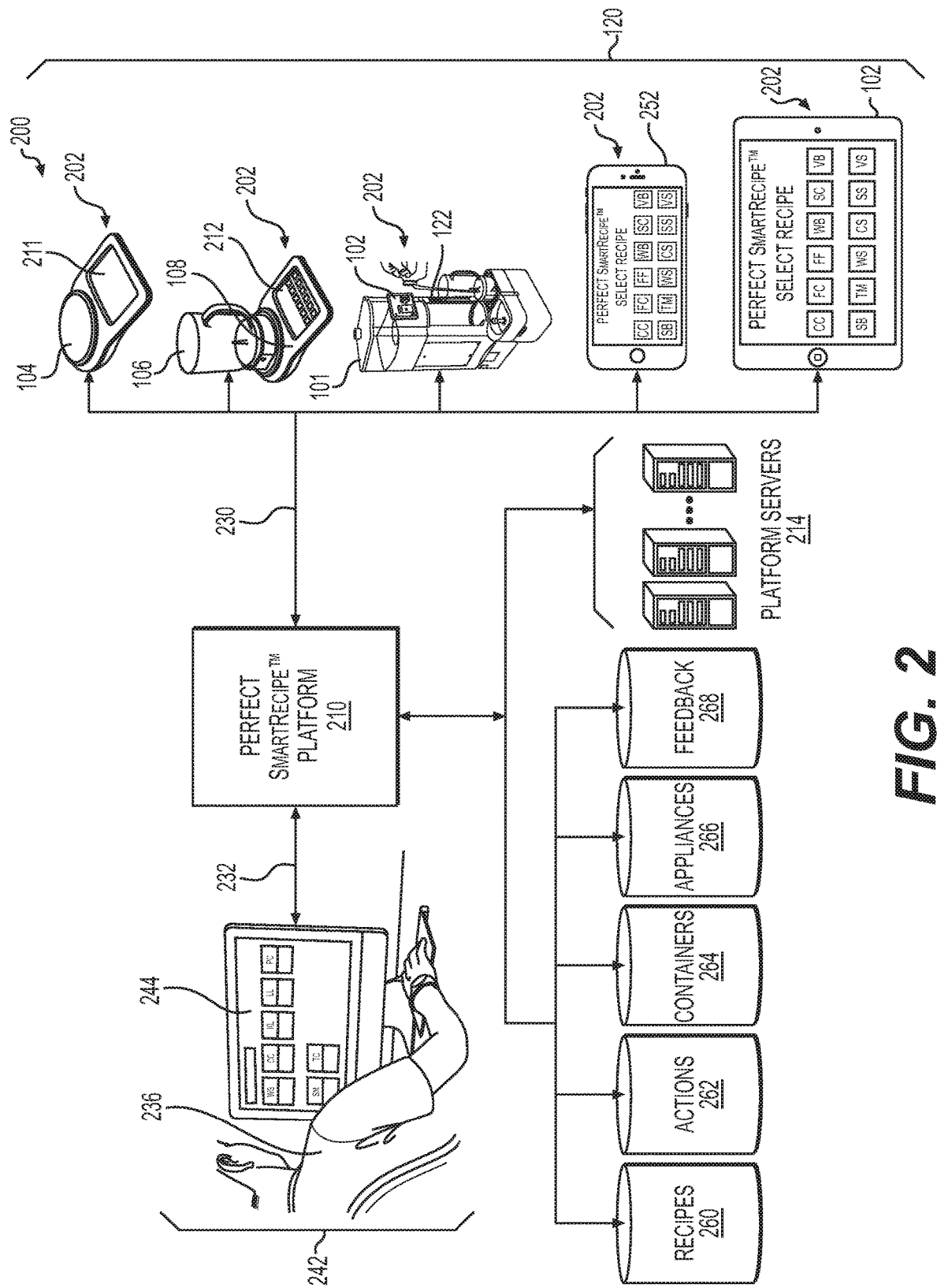
FIG. 2 is a schematic diagram of an illustrative computing environment including the Perfect SmartRecipe™ Software-as-a-Service (SaaS) Platform (usable to provide a recipe for use in a local store.

FIG. 1 is a schematic diagram of an illustrative computing environment of systems and methods 100 usable to provide an appliance 101 and a computing device 102 for processing a recipe (shown in FIG. 2 as recipe 260). The appliance 101 in this example is a combination appliance, including a scale 104 and a blender 108 that are integrated into the housing of the appliance. The device 102 is associated with the appliance 101 through a network 145. A recipe processing application (shown in FIG. 2 as recipe processing app 202) may be installed on the computing device 102. The recipe processing app 202 may be configured to allow a user 124 to access and interact with the appliance 101 using a user interface (UI) 105 on the device 102. The user 124 may be an employee or manager, or similar, of a local store environment 120 in which recipes 260 are used to prepare foodstuffs.

More particularly, display options on the UI 105 may include at least one instruction to operate the appliance 101 for processing the recipe 260. The instruction may be shown in a recipe action block 150. The display options may also include one or more indications of a full control panel 122 of the appliance 101 used to process the recipe 260 ingredients (shown as a "Wild Berry Smoothie" recipe 260A and in FIG. 4A as ingredients 416). The "panel" referenced in the instruction of the recipe action block 150 is the appliance control panel 122 of the appliance 101. In this FIG. 1, the control panel 122 is included in the housing of the appliance 101 as well as on the UI 105. This is shown based on the panel 122 presented in FIG. 1 in enlarged form with a dotted line association to the appliance 101 and the device 102, for illustration purposes.

The recipe processing application 202 receives the recipe 260A and communicates with the appliance 101 and/or its integrated components of the scale 104 and the blender 108 through network 145. Prior to the recipe execution state depicted in FIG. 1, a user has added ingredients 416 to a container 106. The subject action shown in recipe action block 150 occurs after ingredients 416 for the recipe 260A have been added to the container 106, and the container 106 has been moved to the blender 108 portion of the appliance 101.

FIG. 1 presents "blend" instructions in the recipe action block 150 based on the UI 105 presenting one or more indications associated with one or more actions (shown in FIG. 2 as actions 262) for the recipe 260A. In this example, the blend instructions shown in recipe action block 150 include visual depictions of data entry buttons from the control panel 122, and in this respect, may be considered to incorporate portions of the control panel 122. However, the instructions 150 need not provide a duplication of any portion of the control panel 122. Instead, the instructions may provide a narrative, or another representation, including photographs, videos or any form of data, that may convey to the user 124 information related to operating the appliance 101.

The FIG. 1 recipe processing app 202, through the instructions presented on the recipe action block 150 and the control panel 122, may support user 124 data entry options. The data associated with the subject appliance, such as appliance 101, scale 104 and/or blender 108, may guide the user selection and execution of one or more processing steps for the appliance 101. For example, the recipe action block 150 may include instructions for one or more data entry selections related to processing steps for one or more portions of the control panel 122. The UI 105 may also include one or more indications associated with the full appliance 101 control panel 122 that is operable for data entry. For example, an interaction by a user 124 with the control panel 122 on either or both of the appliance 101 or the UI 105 may trigger operation of the appliance 101. More particularly, the operability of one or more indications on the UI 105, associated with one or more portions of the control panel 122, may function in the same manner as if a user 124 selected the same or related data entry options on the actual control panel 122 located on the appliance 101. This is shown in FIG. 1 with an illustration of a finger of the user 124 pointing to data entry on both of the control panel 122 on the appliance 101 and the UI 105.

FIG. 2 is a schematic diagram of an illustrative computing environment 200 including the Perfect SmartRecipe™ Software-as-a-Service (SaaS) Platform 210 (hereinafter referred as "platform" 210) usable to provide recipe 260 for use in a local store (such as, local store environment 120). The platform 210 supports communications with a recipe processing app 202 for the preparation of foodstuffs with one or more of a variety of appliances, such as a scale 104, a blender 108 or a combination scale and blender appliance 101, or similar. Each recipe 260 may include at least two ingredients and at least one action 262. The Perfect SmartRecipe™ SaaS Platform 210 is commercially available from the Perfect Company, Inc. (hereinafter referred to as the "Perfect Company").

The platform 210 may communicate with one or more appliance(s) through a communication connection 230. Each of the appliances 104, 108 or 101 may include a recipe processing application or app 202 installed on a computing device, such as a computing device 211 incorporated into the scale 104, a computing device 212 incorporated into the blender 108, or a computing device 102 associated with the combination scale and blender appliance 101. Computing devices may include one or more of the following: a mobile device such as a tablet 102, a mobile phone 252, desktop computer, laptop computer, handheld computer, computing platform, netbook, smartphone, and other computing platforms. Computing devices may be integral to appliances, as shown in FIG. 2 as 211 and 212, or may include a mobile phone 252 or tablet 102 associated with appliances 104, 108 or 101 (as shown for the appliance 101). In addition, FIG. 2 shows that the tablet 102 is associated with the combination scale and blender appliance 101 and is in communication with the appliance 101 using a network (as shown in FIG. 1 as 145). A computing device may similarly be associated with the other appliances 104 or 108 and may replace the computing devices 211 or 212 presented or may mirror or present a portion of the control panel of devices 211 or 212 on the user interface (UI) of the device 102 (shown in FIG. 1 as UI 105). An appliance 101 connection status indicator (not shown) may signal whether a communication has been established between the appliance 101 and the recipe processing app 202. Appliance 101 may incorporate a control panel 122 shown in the right column of appliance 101 for performing functions of the appliance 101. A control panel 122 of the appliance 101 can operate in a mirrored fashion with the UI 105 of the computing device 102. In another example, a computing device (for example, the computing device that operates the control panel 122) may be integrated into the appliance 101).

Mobile or other devices supporting the recipe processing app 202 may be operated in a variety of different operating systems such as iOS, Android, or Windows Mobile, to name a few examples. Web platforms (not shown) supporting recipe processing app 202 may be operated in a variety of different operating systems such as Microsoft Windows, Apple OS X, Linux, Chrome, Firefox, or Safari, to name a few examples. A variety of operating systems, including hardware and/or software components supporting the recipe processing app 202, or other computer applications or technology platforms or environments in which the recipe processing app 202 are used are within the scope of the instant claims and invention.

The platform 210 may also support interactions with a local store environment 120, where appliances, such as a scale 104, a blender 108 and/or appliance 101, may be operated. For example, one or more server(s) at the local store environment 120 may receive recipes distributed by the platform 210 from a central source environment 242. FIG. 2 further illustrates, in the central source environment 242, a computing device shown as a computer operated by a user 236 (for example, a corporate manager or another employee, or similar). The user 236 may interact with a distribution application 244. In this example, the user 236 may use the distribution application 244 to select recipes 260 for distribution from the central source environment 242 via communication interface 232 through platform 210 to one or more local store environments 120, in which appliances 104, 108 or 101 may be used to create foodstuffs.

The platform 210 may support additional interactions with the central source environment 242. Interactions may include the user 236 to process and finalize recipes 260 for distribution through the platform 210. In another example, one or more recipes 260 may be developed and launched for distribution to other technology environments supporting the preparation of foodstuffs through platform 210 (not shown), as well as the local store environment 120. By utilizing the platform 210, recipe processing may be distributed to one or more platform server(s) so the data processing, collection, sorting, filtering, analysis, and storage associated with the recipes may be more effectively managed. The impact may be an overall reduction in processing loads at any one server associated with recipe processing. More particularly, the platform 210 may provide an additional advantage that a portion of the full processing of any hardware, software and/or a combination of hardware and software components or portions of the processing, such as the creation, distribution, processing and feedback regarding recipes, and/or other processes that are computationally intensive, may be performed on a variety of hardware and/or software resources. Since the platform 210 may support portions of processing in a distributed network approach, computationally intensive processing need not be executed entirely on the local store environment 120 or by the server(s) and processor(s) associated with the web platform or other environments in which the recipe is prepared, but portions of the processing may perform on one of the platform 210 servers as well as other servers, such as the central source environment 242 server(s). Portions of the processing may also be distributed to applications or servers with portions or all the processing components being remote from each other. In addition, processing loads may be distributed across several computational environments, including the platform 210 and/or the local store environment 120 server(s) that may run the systems and methods for processing recipes. Processing loads may also be distributed to other servers that run the platform 210, either independently, or in conjunction with the local store server(s). In this example, the application processing load on the local store environment 120 may be reduced, particularly as to processing feedback that may trigger an update to recipes. A portion or all of this processing may occur through the platform 210 at the server(s) remote from the local store environment 120, thereby providing greater capacity at server resources at the local store environment 120. In other examples, the source of the recipes 260 to the local environment 120 may be from data stored locally (such as, as shown in FIG. 3, local electronic storage) or other technology environments (not shown).

The platform 210 may also perform various other tasks such as, in this example, communicating with one or more databases to store, access and output the content and activities for processing recipes and providing feedback for the platform 210. For example, the platform 210 may store and retrieve data from one or more databases comprising recipes 260, actions 262, containers 264, appliances 266 and feedback 268. One or more platform server(s) 214 may support this processing. The platform 210 also may execute data analytics processing and receive data, including selections and other input, entered by users of the applications computing devices 211, 212, 252 or 102. The platform 210 may process received data to provide feedback for such computing devices 211, 212, 252 or 102 or to provide portions of feedback for transmission to the central source environment 242 for use, for example, by the user 236 to inform decisions about the distribution of recipes 260.

While the platform servers 214 are shown for illustrative purposes in FIG. 2, the processing may be implemented in several environments. Thus the use of platform server(s) 214 is optional. More particularly, a processing environment used to develop a recipe 260 for use in a local store, distribute the recipe 260, and receive and process feedback from recipe 260 execution may vary depending upon the desired implementation of these processes. For example, such processing may occur in any number of environments, such as a cloud environment (shown as platform 210), servers in addition to the server(s) 214, or another processing environment. As one example of recipe distribution, files containing recipe(s) 260 and other data and related components and/or data associated with the recipes 260 or processing of the recipes 260 may be served by a platform server 214 and received at a local browser of a computing device operating an appliance 101.

Figure 3:
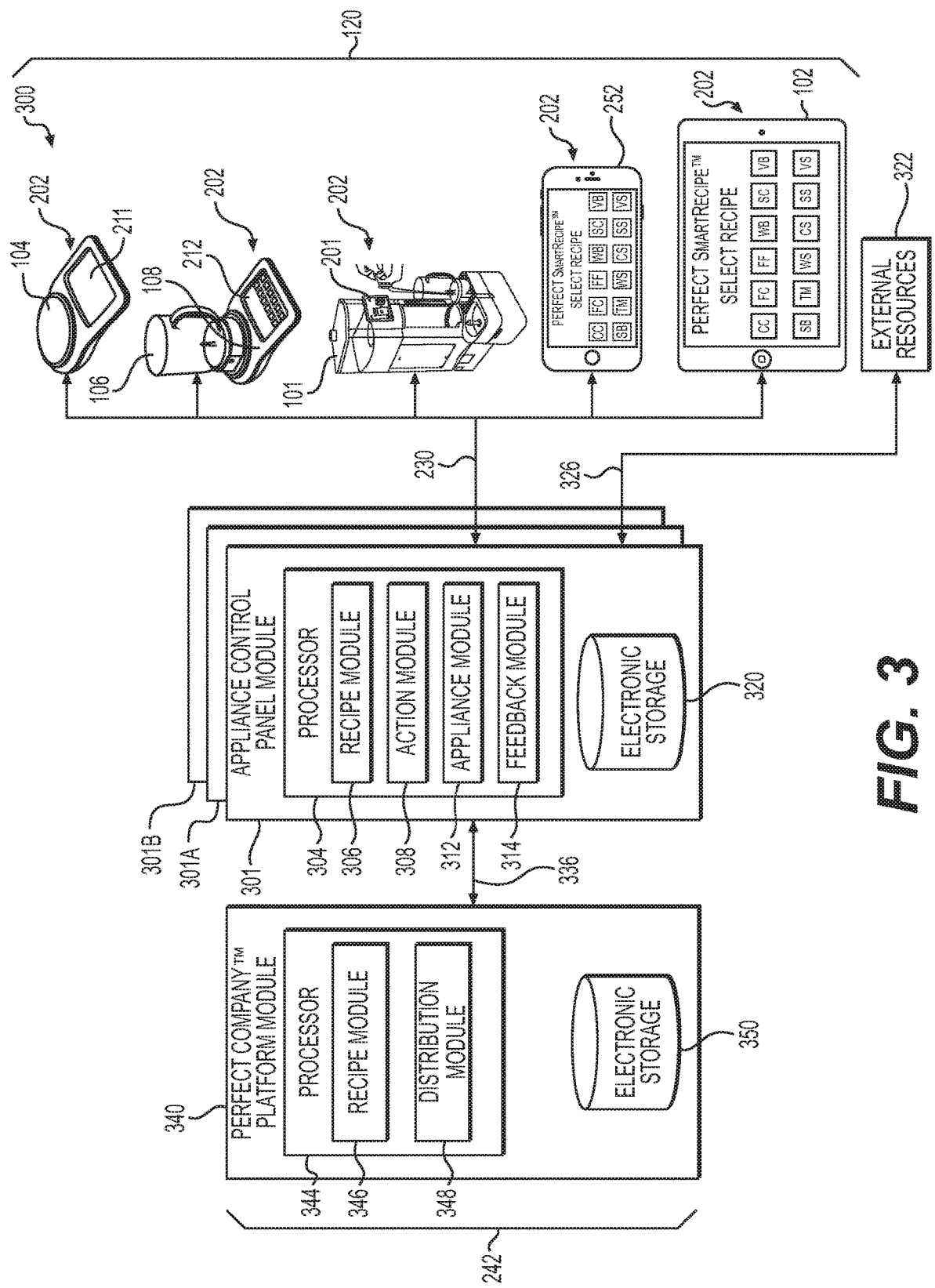
FIG. 3 is a schematic diagram of an illustrative computing environment showing components that communicate to enable various operations involving computing modules and for a local store environment and a central source environment.

FIG. 3 is a schematic diagram of an illustrative computing environment 300 showing components that communicate to enable various operations involving computing modules 301 and 340 for a local store environment 120 and a central source environment 242. The systems and methods of the computing environment 300 provide for various functionalities, operations, or actions involving one or more computing modules 301, 301A, 301B for the local store environment 120, to receive, process and provide feedback for recipes 260. The systems and methods also provide for computing module 340 for the central source environment 242, to prepare and distribute the recipes 260.

The computing module 301, titled "Appliance Control Panel Module," may be implemented in the recipe processing app 202, installed on one or more computing devices 211, 212, 102 (a tablet), 252 (a mobile phone), or similar. Alternatively, computing module 301 may be implemented on another device or platform. The module 301 may represent a single local store environment 120, and the systems and methods may further include distribution of recipes 260 to multiple local store environments 120, shown as modules 301, 301A and/or 301B, et al. In this example, each additional module 301A and/or 301B may include the same components as shown for module 301. In other examples, different modules 301A and/or 301B may include different components than module 301. Module 301 may include at least a processor 304. The processor 304 may further include the following: a recipe module 306 for processing recipes 260; an action module 308 for processing instructions, steps or other activities associated with the recipes 260; an appliance module 312 for processing the identification and/or operation of one or more appliances; and, a feedback module 314 for processing feedback for use by the processor 304 and/or for transmission to module 340 in order to be used by the platform 210. For example, the local store environment 120 may provide updates to appliance operations or operating code that may be beneficial to transmit back to the central source environment 242.

A recipe module 306 may contain or access recipe data. A recipe processing app 202 implementing computing module 301 may retrieve recipe data 260 through recipe module 306. Alternatively, a recipe processing app 202 may retrieve recipe data from a persistent memory on a computing device 211, 212, 252 or 102. As a further alternative, a recipe processing app 202 may retrieve recipe data from another recipe service (not shown). A recipe service may be a public, commercial, or private recipe repository, and retrieval may be free or may require a subscription or usage payment for access. A recipe service may be private to a user, may be shared among a specific group of users, or may be shared among all users of a recipe processing app 202. As a further alternative, a recipe processing app 202 may retrieve recipe data from another computing device via a network 145 (shown in FIG. 1). As another alternative, a recipe processing app 202 may retrieve recipe data from an appliance 101, 104 or 108. As yet a further alternative, a recipe processing app 202 may retrieve data by decoding an indicium on an ingredient carton or package.

An action module 308 may process the actions that may be included in the recipe 260, as processed by the recipe module 306. For example, after adding ingredients to a container in which they will be processed, actions may be detailed in instructions regarding processing, such as mixing, blending, frying, sautéing, baking, or similar. The processing may include one or more appliances. More generally, actions may include the following: identify a container in which to place one or more ingredients; place the container on a scale, set the container aside; replace the container with another container; place one or more ingredients in a separate container; combine ingredients in separate containers; irreversibly mix ingredients together; physically alter one or a combination of ingredients through a process such as blending, sautéing, baking, or the like; mingle ingredients or sets of ingredients without admixture; place the container in an appliance; operate the appliance; enter one or more pieces of data to operate the appliance; take one or more actions to initiate operation of one or more appliances; monitor or change the operation of one or more appliance(s); perform a quality check of the foodstuff; remove the foodstuff from the appliance; place the foodstuff in a serving container; measure one or more properties of the foodstuff for another quality check; or similar. A recipe step may comprise manipulating a device preparatory to a further recipe step, for example, preheating an oven preparatory to baking an assemblage of recipe ingredients. A recipe step may comprise utilizing a device to perform an action upon one or more ingredients, such as baking a cake mix.

The appliance module 312 may include processing for an identification of an appliance, as well as operating code and/or other processing approaches to operate the appliance. Appliance(s) related to a recipe 260 supported by the recipe module 306 may or may not be identified in the recipe 260 as provided to the module 301. In one example, the appliance may be identified based on the module 301 detection of an appliance available within the environment 120, such as through the network 145.

The module 301 may further include an electronic storage 320. The module 301 may engage in two-way or one-way communications with the computing devices 211, 212, 252 or 102, associated with one of the smart scale 104, the blender 108, or the appliance 101 using a communication connection 230. The module 301 may also communicate with external resources 322 using a communication connection 326. Module 301 may also communicate with computing module 340 using a communication connection 336.

The computing module 340, titled the "Perfect Company™ Platform Module," may be implemented using one or more applications at a central source environment 242, or may be implemented on one or more discrete platforms or devices. Module 340 may include processing to create, modify or distribute one or more recipes 260 to a module 301 using a communication connection 336. Module 340 may include at least a processor 344. The processor 344 may further include a recipe module 346 for creating and/or modifying recipes 260, and a distribution module 348 for processing the distribution of recipes 260 to one or more modules 301, 301A, 301B, et al. Module 340 may further include an electronic storage 350. The communication connections 230, 326 and 336 may be wired or wireless and may be one-way or two-way.

The computing modules 301 and 340 may further include one or more algorithms, software, a component of a software, or a database that performs, or is involved in the performance of, one or more operations including calculating values, retrieving data, storing data, editing a file, deleting files, transmitting data or instructions, receiving data or instructions, displaying various types of information or data, processing data, and allowing communication between two or more devices, servers, or networks.

The local source environment 120 computing devices 211, 212, 252 or 102 also include a recipe processing app 202. The recipe processing app 202 may be configured to transmit or receive essentially real-time information to or from an appliance 104, 108 or 101. In another example, portions of the recipe processing app 202 operation may occur in multiple computing devices 211, 212, 252 or 102. The recipe processing app 202 may access information relating to recipes, ingredients, target weight or nutritional information, and corresponding nutritional information for given amounts of ingredients in a recipe. The recipe processing app 202 may further access information relating to feedback based on the actual weight measurement of ingredients from a scale 104. The recipe processing app 202 may access information from local, external, and/or online databases, including metadata for recipes. The recipe processing app 202 may also present a user with a UI (as shown in FIGS. 1 and 6-8) that provides menus and menu options. The UI may also provide approaches for entering, searching, storing, and identifying user inputs, information, and data. Such user inputs, information and data may include actions to be performed; amounts of ingredients to be added; the calculation of the actual ingredient weight measurement by the scale 104 and a comparison to the target weight of the ingredient; adjustments to one or more ingredients and/or recipes, including based on a difference between the target weight of the ingredient and the actual ingredient weight measurement; corresponding nutritional information for a given ingredient quantity, a combination of ingredients and/or the total nutrition for the complete recipe; recipes with similar total nutritional values; links; or similar. The recipe processing app 202 may be configured to receive commands or instructions via various methods for user inputs such as using a touchscreen display, keypad, keyboard, voice commands, visual commands, and similar. For example, the smart scale 104, the blender 108, or the appliance 101 may have a button pad that allows transmission of instructions or commands to the recipe processing app 202, or vice versa.

The recipe processing app 202 may further be configured to assist the user by displaying one or more indications of actions on the UI of one or more appliances 104, 108 or 101. The actions may be in the form of instructions to operate the appliances. During measuring of ingredients as one action, additional indications may also be provided by receiving measurement feedback from a scale 104. The display of actions on the UI also may include operable UI portions that may receive data entry for one or more indications associated with the control panels of appliances. For the scale 104, when an actual ingredient weight measurement detected by the scale 104 is different than the target weight of the ingredient as included in the recipe 260, the recipe processing app 202 may automatically display one or both of the actual ingredient weight measurement and the target ingredient weight. The recipe processing app 202 may then select one of the actual ingredient weight measurement or the target ingredient weight for continuing to process the recipe. The recipe processing app 202 may also calculate the impact of the difference between the target and actual weights on the nutritional information for the ingredient or complete or total recipe 260 (not shown). The display on the UI may further be operable to enable the user to select one of the actual or target ingredient weight for continuing to process the recipe 260.

The smart scale 104, blender 108 or appliance 101 and their respective computing device 211, 212, 102 or 252, may have one or more processors configured to execute various functions, operations, commands, functionalities, processes, and computer modules. In other examples, the system 300 may utilize other devices or platforms for executing various functions, including, for example, receiving data from the smart scale 104, blender 108 or appliance 101 and processing the data to provide for the next operation of the appliance 104, 108 or 101. The appliances 104, 108 or 101 also may include processors remotely accessible through platform 210. In another example, the appliances 104, 108 or 101 further may include a portion or all the processing capabilities, or the processing may occur on a distributed network with portions or full processing implemented in one or more server(s), which are distributed within a network between remote devices. One example of a communications channel is shown in FIG. 1 as a network 145.

The appliances 104, 108 or 101 may further include notification or feedback systems in the form of optical and audio signals or alerts that may be used to assist the user when performing an operation. Audio or visual prompts for the user may be activated from a computing device 211, 212, 252 or 102, or an appliance 104, 108 or 101. For example, a recipe processing app 202 may talk a user through operation of the appliances 104, 108 or 101. It may also provide incremental audio notices during a sequence of appliance operations. For example, during a blending operation, one of an audio tone, length or level may indicate a slow blend speed while a different audio tone, length or level may indicate a different blend speed, or the tone and/or level may change as the blending operation is close to completion.

A computing device 211, 212, 102 or 252 may be configured to allow a user to access and interact with any components of the system via a recipe processing app 202 (shown in FIG. 2) installed on the computing device 211, 212, 252 or 102. A computing device 211, 212, 102 or 252 may also include a UI (shown in FIGS. 1 and 6-8), one or more processors, electronic storage, and other components. A computing device 211, 212, 252 or 102 may further include one or more of the following: a desktop computer, laptop computer, handheld computer, tablet computing platform, netbook, smartphone, and other computing platforms. A computing device 211, 212, 102 or 252 may send commands to or receive requests or prompts from the appliances 104, 108 or 101.

A UI on a computing device 211, 212, 252 or 102 and/or appliances 104, 108 or 101 may show various types of information in approximately real-time, such as the instructions for operating appliances 104, 108 or 101 and one or more indications associated with one or more data fields or other data of control panels of the appliances 104, 108 or 101. In one example, a recipe processing app 202 may include at least one display integrated with appliances 104 or 108 or at least one UI display that forms part of a computing device 102 or 252. Appliances 104, 108 or 101 may also show approximately real-time information that includes the connection status with a computing device external to the appliances, such as 102 or 252.

A UI 105 may also be configured to provide interface functionality to a user and at least one computing device 211, 212, 252 or 102 through which the user 124 may provide information to and receive information from the system. This enables data, user comments, feedbacks, alerts, results, queries, instructions, or similar, herein collectively referred to as "information," to be exchanged between the user and the computing device 211, 212, 252 or 102 and thereby to a platform 210. Examples of UI 105 hardware and/or software components include a touch screen, keypad, touch sensitive and physical buttons, switches, keyboard, knobs, levers, display, speakers, microphone, indicator light, audible alarm, printer, and other interface devices. In some system implementations, the UI 105 includes a plurality of separate interfaces. The UI 105 may include at least one interface integrated with the computing device 211, 212, 252 or 102. In further examples, a UI 105 may refer to software, hardware, a combination of hardware and software, or a device the primary function of which is to allow communications or interactions between two or more devices or between a user or plurality of users and one or more devices. A UI 105 may be configured such that a user may navigate through electronic folders, databases, servers, networks, and various local or external storage media to locate, view, select, or store the desired recipe. In addition, data provided to the user via one or more formats (such as, one or more indications on a user interface, including a first indication, a second indication, a third indication, a fourth indication, a fifth indication et al.) may be presented as one or more of text, alphanumeric characters, graphics, scale, charts, visual indications, audio indications, video indications or other depictions.

The computing architecture as shown, for example, in FIGS. 1-3 may include one or more processors and one or more computer-readable media that store various modules, applications, programs, or other data. The computer-readable media may include instructions that, when executed by one or more processors, cause the processors to perform the operations described herein. The one or more processors may include any suitable type of processor including, without limitation, central processing units or graphics processing units.

Implementations also may be provided as a computer program product including a non-transitory machine-readable storage medium having stored instructions thereon (in compressed or uncompressed form) that may be used to program a computer (or another electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, examples may also be provided as a computer program product including a non-transitory or transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. Also, system memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which may be used to store the desired information and which may be accessed by the carrier servers.

Figure 4A:
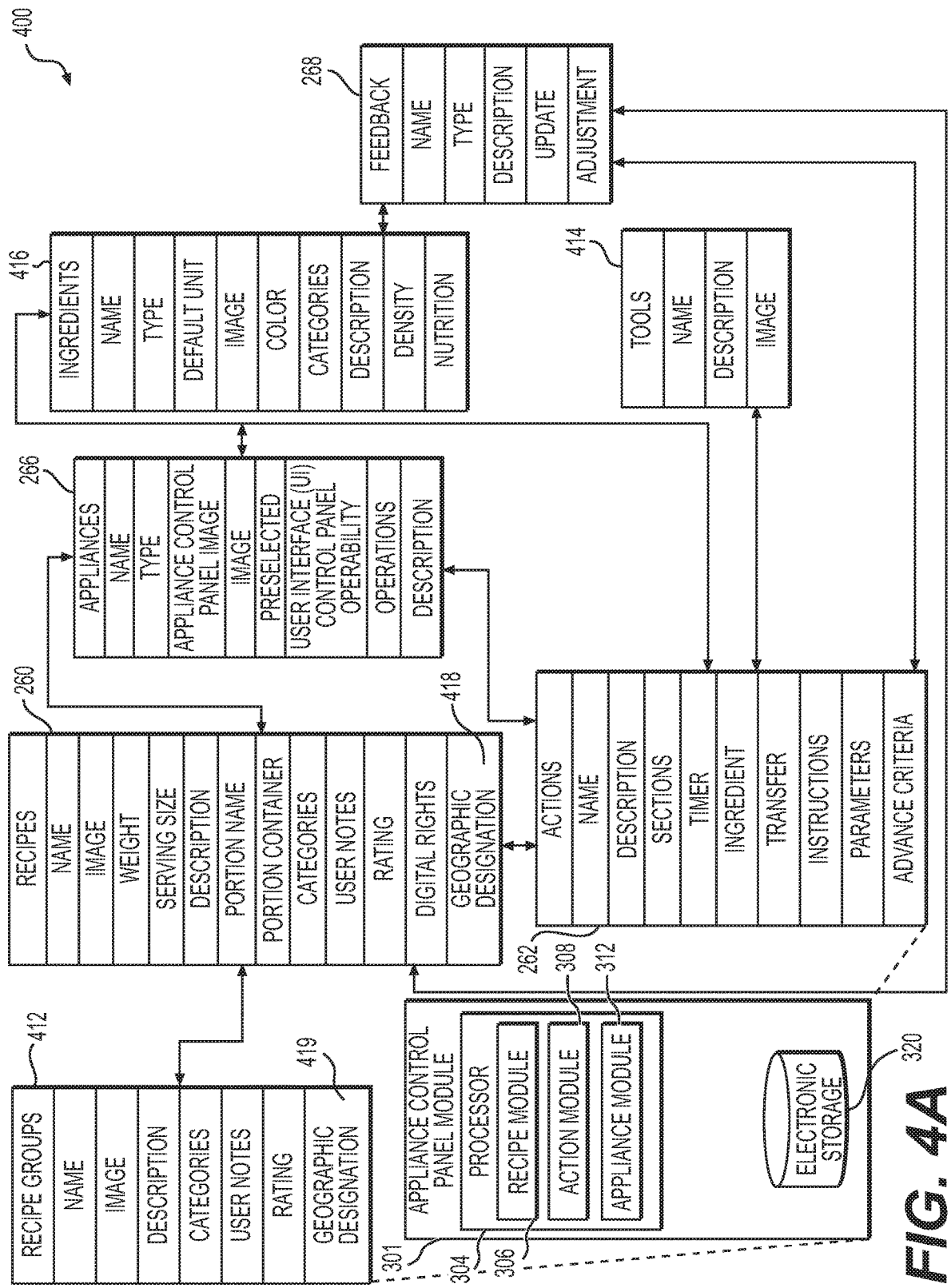

FIG. 4A is an illustrative data structure 400 showing data flows among various data sets associated with the systems and methods for processing and providing feedback for recipes 260 using recipe processing app 202, as well as distributing recipes 260 on the platform 210. Processing of a specific combination of data and information may be triggered by a user (including a user 124, such as an employee in a local store environment 120, or another user 236 in a central source environment 242, or similar) as a result of a command, user input, recipe-prescribed user action, or user selection from a recipe processing app 202 or recipe distribution app 244 of a menu or data selection option via a user interface (UI) 105 (shown in FIGS. 1 and 7C) or interfaces on computing devices 211, 212, 252 or 102 (as discussed further regarding FIGS. 6-8). Processing may be triggered alternatively or additionally by one or more signals detected by one or more system sensors. The data and processing may be supported by the module 301.

The various datasets include the recipe 260 data, the action 262 data, the appliance 266 data (an additional dataset for containers 264 also may be provided, not shown), the feedback 268 data, the recipe group 412 data, the tool 414 data and the ingredient 416 data. The datasets 260, 262, 266, 268, 412, 414 and 416 show various data and information such as recipes 260, ingredients 416 and actions 262 for recipes 260, as well as feedback 268. In addition, one or more data sets may also include the following fields: name, type, image, appliance control panel image, user interface control panel operability, operations, description, categories, user notes, rating, digital rights, geographic designation fields (418 and 419), portion name, portion container, serving size, color, default unit, density, nutrition, sections, timer, transfer, instructions, update, adjustment and parameters. The data sets may be stored in the same or different electronic storage media, such as for example electronic storage 320.

The recipe 260 data may communicate and access each of the ingredient 416 data, the action 262 data, the appliance data 266, the recipe group 412 data, the feedback 268 data and the tool 414 data. Each of the data sets 260, 262, 266, 268, 412, 414 and 416 also includes specific data. For example, for the appliance data 266, in addition to the basic data of the name, type, operations and description, the data set 266 may include: an appliance control panel image; whether the appliance is preselected in the recipe; and, whether the appliance may receive data from the recipe processing app 202 based on the UI 105 being operable to receive data entry associated with the control panel of the appliance; or similar. In addition, the feedback data 268 may include type, description and update.

Recipe ingredient 416 data may comprise a name and a target weight and/or volume of a specific ingredient. The density of an ingredient 416 connects the weight and volume of an ingredient by the relationship that weight equals volume multiplied by density. Expected density data for an ingredient 416 may be included within recipe 260 metadata. Expected density data also may be encoded within a recipe processing app 202. Expected density data further may be acquired from a recipe service, such as provided by platform 210. Expected density data may be acquired over a network from other computing devices 211, 212, 252 or 102. Expected density data may be read from a package containing an ingredient, or may be downloaded from a manufacturer's or supplier's website. Expected density data may be acquired by other similar means from a public, commercial, or private source.

Recipe ingredient 416 data may further comprise an acceptable minimum and maximum weight or volume of a discrete ingredient. Recipe ingredient 416 data may further comprise a weight estimate for a discrete ingredient for which multiple discrete ingredients may be required by a recipe. For example, if a recipe requires 10 graham crackers, an estimate of or an upper and a lower bound for the weight of a single graham cracker may be specified by recipe ingredient 416 data to permit counting of crackers being added in a recipe ingredient step.

Recipe data may further comprise recipe metadata. Recipe metadata may further comprise metadata defining nutritional information for one or more ingredients in the recipe. Additionally, or as an alternative, a recipe processing app 202 may acquire nutritional information for one or more ingredients in the recipe by acquiring nutritional data from a recipe service, such as provided by platform 210. Additionally or as an alternative, a recipe processing app 202 may acquire nutritional information for one or more ingredients in the recipe by accessing a public, commercial, or private data service using a network 145.

Recipe metadata may yet further comprise at least one or more appliances to be used in performing a recipe step, such as the use of a blender or a category or brand of blender, or similar. As a yet further example, recipe metadata may specify a duration for blending to be utilized with a given size and shape of a blending container. As a yet further example, recipe metadata may specify a specific sequence of recipe ingredient steps for a given size and shape of a blending container.

Recipe metadata may yet further comprise metadata specifying limitations or exceptions to be applied to the selection of one or more serving sizes for the recipe, including limitations on particular serving sizes as a function of an appliance used to process the recipe. For example, recipe metadata may specify a minimum, an optimal, and a maximum serving size for a recipe. As a further example, recipe metadata may specify a minimum, an optimal, and a maximum weight for a recipe.

The data sets and their specific data may be transmitted to or shared with other data sets to allow the processing of various data and to generate output information for the computing modules 301 and 340. Examples of output information are a message, alert, notification, feedback, update, or the result of a calculation associated with an individual ingredient or a combination of ingredients, as well as the outcome of an action. The generation of output information may be triggered by an event. For example, if there is a difference between the target and actual nutritional data of an individual ingredient or a combination of ingredients, including the total nutritional data for a recipe, output information may be generated to signal that the actual nutritional value differs from the nutritional information advertised for the foodstuff. An event trigger may cause output information to be generated to reflect a normal condition or an abnormal condition. For example, processing of a recipe 260 with a resulting foodstuff that provides characteristics of the recipe within a reasonable range of the target characteristics, such as the density of a frozen or protein beverage, may result in the generation of output information signaling the successful execution of the recipe 260. Alternatively, or additionally, execution of a recipe 260 with a resulting foodstuff that fails to provide consistent characteristics within a certain range of target characteristics, such as for example with a measured density that is outside of a threshold amount of a target density for a recipe 260, may result in the generation of output information signaling the failed execution of the recipe 260. An event trigger may cause output information to be generated following an error in executing a recipe 260. For example, if a user 124 accidentally or deliberately performs an under pour or an over pour, output information may be generated and a notification provided, for example on display UI 105 reflecting the error (not shown).

The appliance data 266 is now further described. FIG. 4B is an illustrative data structure 402 in the form of a table showing exemplary appliance data for several appliances 101, 104 or 108. The appliance data 266 may include: appliance name 420, type 422, appliance control panel image 424, image 430, preselected 432 (or whether the appliance is preselected in the recipe 260), operability 434 (or whether a user interface (UI) displaying one or more indications associated with one or more data fields of the control panel is operable to receive data for operation of the appliance), operations 436 and description 438. As shown in FIG. 1, an appliance 101 is featured, including a combination of a scale 104 and a blender 108; the combination appliance 101 includes a control panel 122. A computing device 102 also communicates with the appliance 101. The computing device 102 is a tablet, which includes a UI 105. The UI displays one or more indications associated with the control panel 122 of the appliance 101, such as the data fields of the control panel 122. The one or more indications in the FIG. 1 UI 105 are a duplication of the control panel 122. This information is reflected in row 440 of table 402 for the appliance 266 dataset as follows: appliance name 420 is a Perfect Company™ combination appliance (such as appliance 101); the type 422 is scale and blender; the appliance control panel image 424 is the control panel as shown in FIG. 1 as 122; the image 430 is a depiction of the appliance 101; preselected 432 indicates that the appliance may be preselected; operability 434 indicates that a UI control panel may be operable to receive data entry for transmission to the appliance; the operations 436 are presented as "operations of scale and blender"; and, the description 438 is presented as "combination appliance, including scale and blender." Additional appliances are shown in rows 442 and 444 of table 402. The appliance 266 data in row 442 of table 402 is as follows: appliance name 420 is a Perfect Company™ commercial scale (such as scale 104); the type 422 is scale; appliance control panel image 424 is an exemplary control panel including a display of nutrient data, as well as a toggle option to select an actual ingredient weight measurement or a target ingredient weight based on the operation of the scale 104 in weighing a subject ingredient 416; the image 430 is a depiction of the scale 104; preselected 432 indicates that the appliance may not be preselected (in other examples, the scale 104 may be preselected); operability 434 indicates that a UI control panel may not be operable to receive data entry for transmission to the appliance (in other examples, the operability of the scale 104 to receive data from a UI display may be available); the operations 436 are presented as "operations of scale"; and, the description 438 is presented as "scale with selection of actual weight measurement or target." The description 438 of the scale 104 presents that the control panel of this particular scale 104 presents a data field for the actual ingredient weight measurement and/or the target ingredient weight (or the data entry options may be presented as a toggle or separate data fields, or similar). For other scales, no data entry or additional data entry options may be presented or the control panel need not support data entry. The data in row 444 of table 402 is as follows: appliance name 420 is the Vitamix 780 Black Home Blender (which may be an example of a blender 108); the type 422 is blender; appliance control panel image 424 is an exemplary control panel including a display of digital data fields for various blender operations; the image 430 is a depiction of the blender 108; preselected 432 indicates that the appliance may be preselected (in other examples, the blender 108 may not be preselected); operability 434 indicates that a UI control panel may be operable to receive data entry for transmission to the appliance (in other examples, the operability of the blender 108 to receive data from a UI display may not be available); the operations 436 are presented as "operations of blender"; and, the description 438 is presented as "blender with digital control panel." The exemplary appliances 101, 104 or 108 shown in table 402 are indicative of a range of appliances and control panels, as well as operations and functionality, which may apply to the systems and methods of the present disclosure. The integration of such appliances 266 with the UI 105 of a computing device, such as tablet 102, may increase with commercial applications to support the consistent quality requirements in these settings, while optimizing the training to focus on potentially a single UI 105 for all data entry with which to process the recipe 260.

Figure 5:
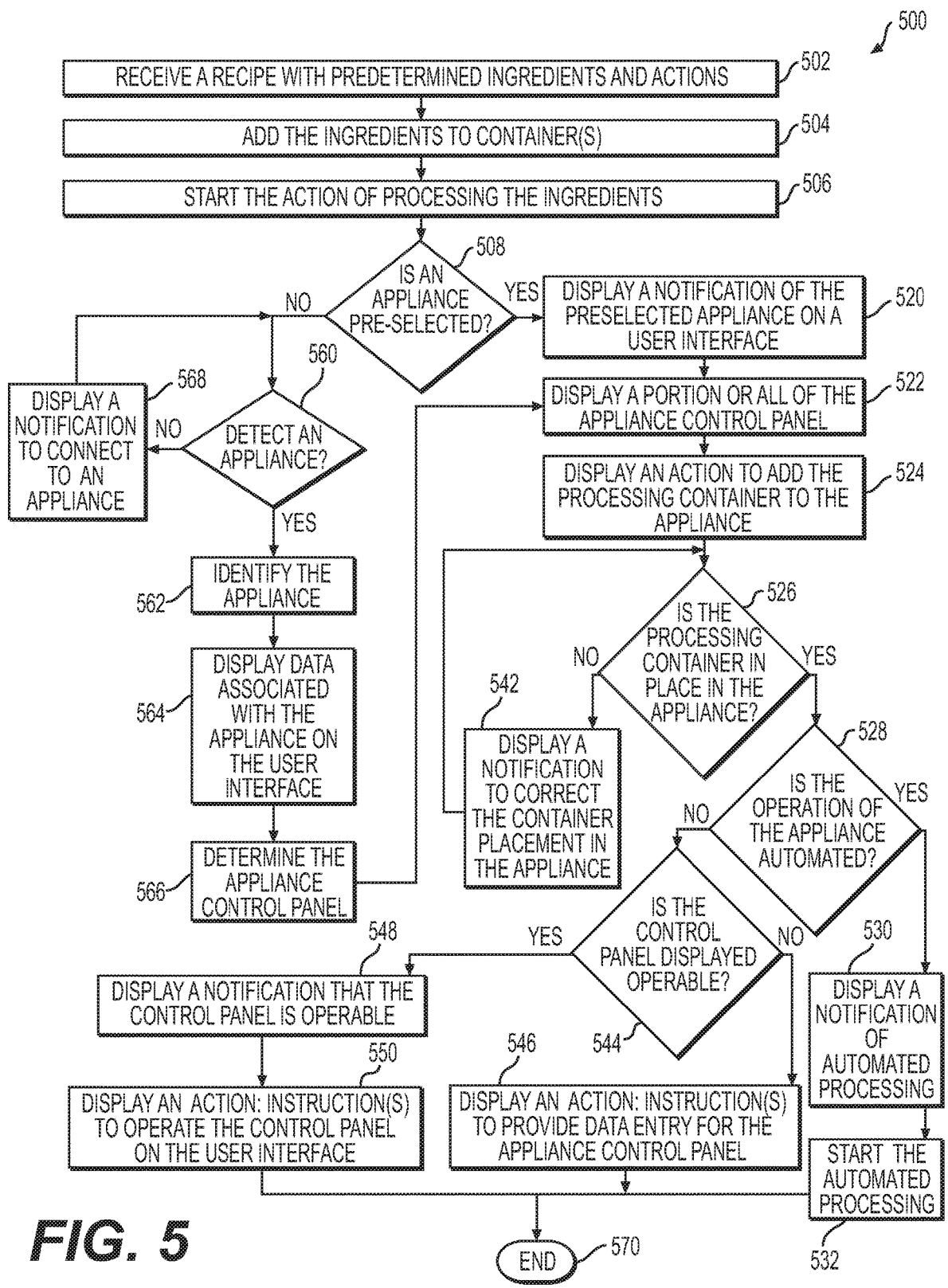
FIG. 5 is a flow diagram showing a process for receiving a recipe from a server and for implementing actions using a recipe processing app to process the ingredients.

FIG. 5 is a flow diagram showing a process 500 for receiving a recipe 260 from a server and for implementing actions using a recipe processing app 202 to process the ingredients 416. The process 500 generally occurs after the ingredients have been added to the container and includes identifying appliances associated with the recipe 260 and processing the ingredients 416 using the appliance(s). The process 500 is illustrated as a collection of blocks in a logical-flow graph, which represents a sequence of operations that may be implemented in hardware, software, or a combination thereof. Numbers 502-570 reference the blocks. Each of the operations 508, 526, 528, 544 and 560 represents the processing of a query with two paths for subsequent processing based on an affirmative indication from the recipe processing app 202 to the query and, alternatively, a negative indication from the recipe processing app 202 to the query.

The process 500 is now described. In operation 502, recipe 260 data is received from a server (including for example one or more of the platform servers 214 or other servers). The recipe 260 includes predetermined ingredients 416. Data received in operation 502 is next provided to operation 504, where ingredients are added to the container(s) in preparation for processing. If one or more ingredients are to be processed, operation 506 initiates the processing of the ingredients. Operation 506 then prompts operation 508. At operation 508, it is determined whether an appliance has been preselected. If the recipe processing app 202 produces an affirmative indication, operation 520 is invoked. In operation 520, the user interface (UI) created by the recipe processing app 202 displays a notification of the preselected appliance. Operation 520 then invokes operation 522, described below. However, at operation 508, if the recipe processing app 202 produces a negative indication as to whether an appliance has been pre-selected, operation 560 is invoked. In operation 560, it is determined whether an appliance has been detected. If an appliance has been detected, operation 562 is invoked. In operation 562, the appliance is identified. Once the appliance has been identified, operation 564 is invoked. In operation 564, one or more indications associated with the appliance are displayed on the UI.

Operation 564 then prompts operation 566 to determine the appliance control panel. Operation 566 then invokes operation 522, whereby the UI displays a portion of the appliance control panel or all of the appliance control panel. Operation 522 then invokes operation 524, whereby the UI displays an action to add the processing container with the recipe admixture to the appliance. Operation 524 then invokes operation 526. At operation 526, the user is prompted to determine whether the processing container is in place in the appliance. If the recipe processing app 202 produces an affirmative indication, operation 528 is invoked. In operation 528, it is determined whether the operation of the appliance is automated. If the recipe processing app 202 further produces an affirmative indication in operation 528, operation 530 is invoked. In operation 530, the UI displays a notification of automated processing. Operation 530 then triggers operation 532, whereby the automated processing is initiated by the recipe processing app 202. After the automated processing completes, operation 570 ends process 500.

If at operation 528, it is instead determined by the recipe processing app 202 that the operation of the appliance is not automated, then operation 544 is invoked. In operation 544, it is determined whether the control panel displayed is operable. If the recipe processing app 202 responds affirmatively, operation 546 is invoked. In operation 546, the UI displays an action including instruction(s) to provide data entry for the appliance control panel. Operation 570 then ends process 500. If the recipe processing app 202 produces a negative indication, at operation 544, operation 548 is invoked. In operation 548, the UI displays a notification that the control panel is operable. Operation 548 then triggers operation 550. In operation 550, the UI displays an action including instruction(s), to provide data entry for the operation of the control panel on the UI.

Returning to a negative indication produced by the recipe processing app 202 to operation 526, operation 542 is then invoked, whereby the UI displays a notification to correct the container placement in the appliance. Then, operation 542 returns processing to operation 526. Returning to a negative indication produced by the recipe processing app 202 to operation 560, operation 568 is invoked. In operation 568, the UI displays a notification to connect to an appliance. Upon completion, operation 568 returns to operation 560.

Figure 6:
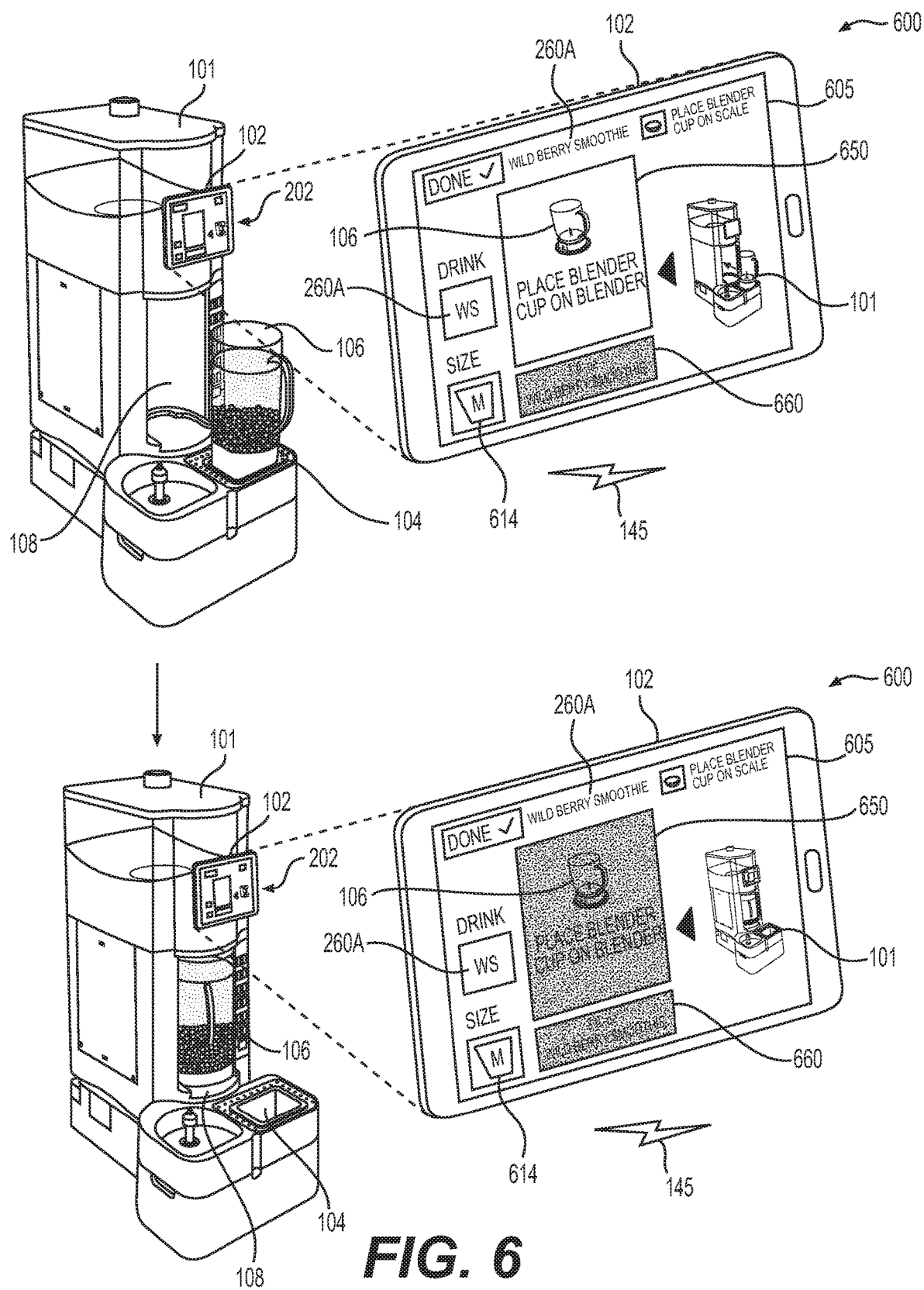
FIG. 6 depicts two schematic diagrams of an illustrative example of systems and methods usable to provide an appliance, including a smart scale and a blender, as well as a computing device for processing a recipe.

FIG. 6 depicts two schematic diagrams of an illustrative example of systems and methods 600 usable to provide an appliance 101, incorporating a smart scale 104 and a blender 108, along with a computing device 102 suitable for processing a recipe 260A. The computing device 102 may be associated with the appliance 101 through a network 145. The computing device 102 includes the installation of a recipe processing app 202 for guiding a user 124 (for example, an employee and/or store manager, as shown in FIG. 1) to execute the recipe 260A. The execution may include as follows: receiving the recipe 260A from a server; processing the ingredients 416 of the recipe 260A; and, providing feedback to a user 124 during the execution of the recipe 260A. The computing device 102 may be configured to allow a user 124 to access and interact with any components of the systems and methods 600 via the recipe processing app 202. The computing device 102 may include the user interface (UI) 605, one or more processors, electronic storage, and other components. The computing device 102 may be one or more of the following: a desktop computer, laptop computer, handheld computer, tablet computing platform, netbook, smartphone, and other computing platforms. The computing device 102 may send commands to or receive requests or prompts from the appliance 101, or any other appliance such as a scale 104 or a blender 108. A recipe 260A may be conveyed from storage in the central source environment 242, using one or more central processor(s) at one or more central server(s) through the platform 210 to one or more local store environments 120.

In one example, a user 124 utilizes a computing device 102 to view recipe data 260A, which may be present in the memory of computing device 102 or may be retrieved from a recipe service (for example, as provided or accessed by the platform 210). For example, the recipe processing app 202 installed on the computing device 102 may be configured to allow the user 124 to access and interact with one or more appliances 101, 104 and/or 108 for execution of recipe 260A. The recipe processing app 202 UI 605 may display the recipe 260A ingredients 416 and actions 262 with the use of one or more recipe blocks 650 and 660 for preparing the foodstuffs. More particularly, to execute a recipe 260A, a user 124 successively performs operations depicted in recipe blocks 150 (as shown in FIG. 1), 650 and 660, including measuring ingredients and/or performing other actions 262 as required to complete the creation of the associated foodstuff. The recipe actions 262 may be presented in recipe action blocks 150 and 650, and the ingredients 416 may be presented in recipe ingredient block 660. FIG. 6 is an illustrative example of the components and functionality shown upon the completion of adding specific ingredients 416 for the recipe 260A to container 106 for subsequent processing as described below. The recipe blocks 150, 650 and 660 may contain one or more of visual, textual, audio and/or video information about each ingredient, such as shapes, a listing of each ingredient 416 and/or nutritional information, or similar data associated with the recipe 260A, ingredients 416 and actions 262 to prepare the foodstuff. In one example, at any moment, at most one recipe block may be the active recipe block, which corresponds to the recipe ingredient 416 and/or action 262 that the user 124 is currently performing. In alternative examples, multiple recipe blocks may be active, such as when two actions 262 are being executed simultaneously. One example of multiple actions is preparing icing while a cake is baking, or similar.

The recipe processing app 202 may automatically activate the recipe blocks, such as recipe action block 650 shown in the top portion of FIG. 6 after the completion of the prior recipe ingredient block 660. Once a recipe block has been completed, such as block 660, the completed recipe block 660 may be deactivated and a next successive recipe block 650 may be activated. When a recipe block 660 is deactivated or completed, the visual appearance of the recipe block 660 may be modified to signal the completion of the activity associated with the block 660 (where in this example, the activity associated with the ingredient 416 shown in block 660 is to add the ingredient 416 to a container 106). A determination of the completion of an active recipe block 150, 650 or 660 may be performed automatically by recipe processing app 202 or may be signaled by user input. In additional examples, as the recipe step(s) of an active recipe block is being performed, the appearance of the active recipe action block may change to signal the interim state of completion of the recipe block. For example, if the action associated with an active recipe action block is a timer action, the background of the active recipe action block may be modified in a manner to suggest the portion of total time that has elapsed since the timer started, such as a change in appearance of a portion of the recipe block, blinking, lighting, a change in color palette or size font, or similar (not shown).

Upon completion of the addition of ingredients 416 to a container 106 (such as, for example a blender cup or container 106), the recipe processing app 202 installed on the computing device 102 may be configured to allow a user 124 to access and interact with the appliance 101 for execution of recipe 260A. These interactions may include executing the instructions on a recipe action block 650 for the next action of placing the container 106 onto the blender 108 of the appliance 101. In one example, a recipe action block 650 may signal a type of action, such as for example mixing ingredients, operating a blender, or baking a recipe mixture, or similar. A recipe action block may also signal a target duration of an action. A recipe action block may further identify an appliance, such as appliance 101, to be utilized to undertake an action. The UI 605 includes an indication of the "WS" Wild Berry Smoothie recipe 260A (on the left-hand column as well as the header) and the "M" medium serving size 614 (on the left-hand column). The recipe action block 650 may also include pictorial and narrative instructions, such as a depiction of the blender container 106 and an instruction to "place blender cup on blender." The top portion of FIG. 6 also illustrates a pictorial of the appliance 101 with the container 106 on the scale 104 prior to movement of the container 106, and an arrow to indicate the direction of movement of the container 106, for placement on the blender 108. The bottom portion of FIG. 6 illustrates the completion of the recipe action block 650 (including a change in the highlighting of the block as an additional indication of a completion of the action 262) after the recipe processing app 202 has detected that the container 106 has been detected on the blender 108. FIG. 6 also includes a recipe ingredient block 660 for an ingredient 416 (or a Wild Berry Smoothie base) of recipe 260A. In this example, in the top portion, the recipe ingredient block 660 is shown at a location on the bottom of UI 605 as completed and the recipe action block 650 without highlighting is shown as the current action. Then, in the bottom portion, the recipe action block 650 is shown as completed, with the container 106 moved to the scale 104 of the appliance 101.

Figure 7A:
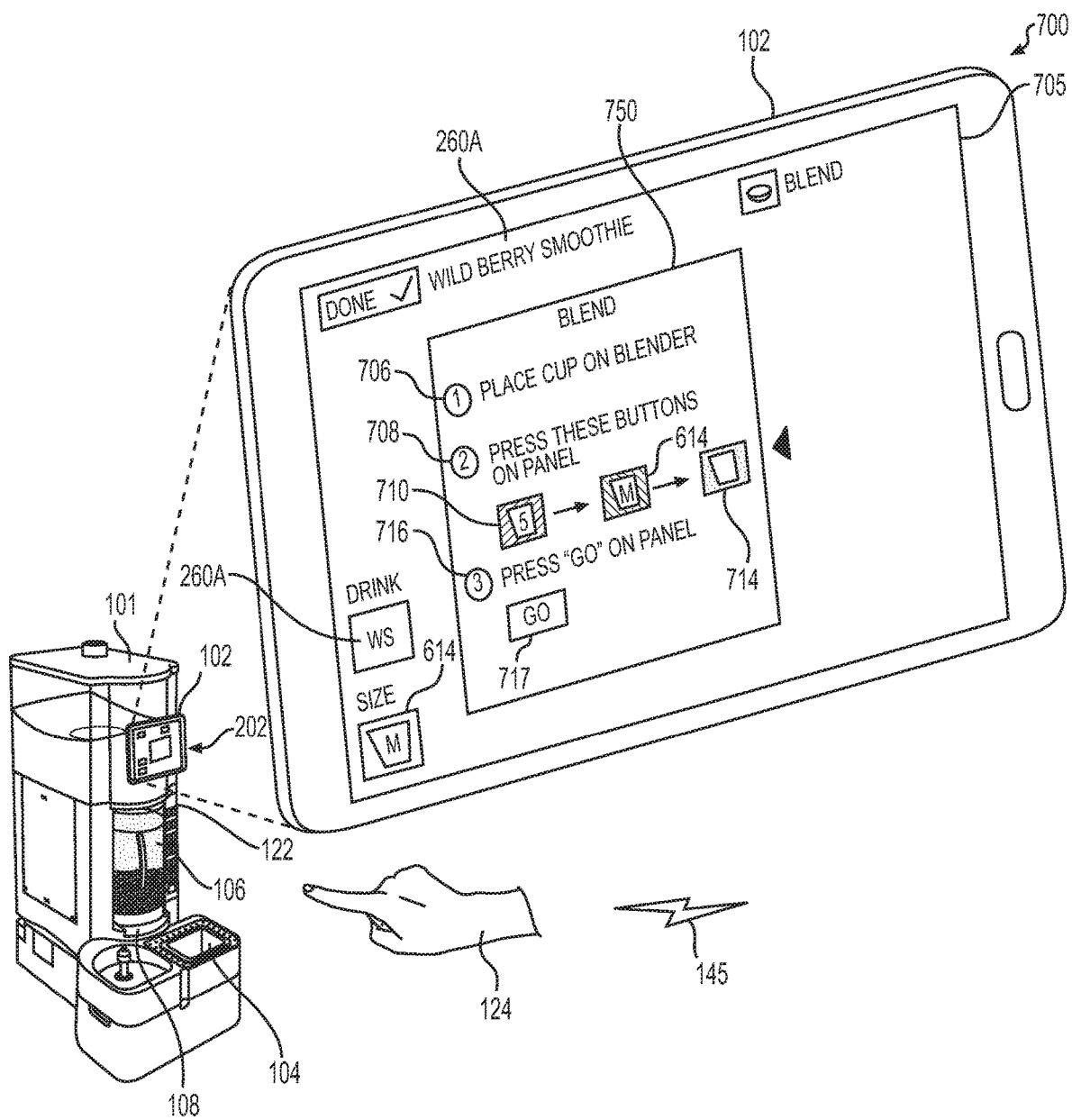
FIGS. 7A-7C are schematic diagrams of an illustrative computing environment of systems and methods usable to provide user interfaces (1.11s) with a variety of display options for actions in the execution of the recipe.
Figure 7B:
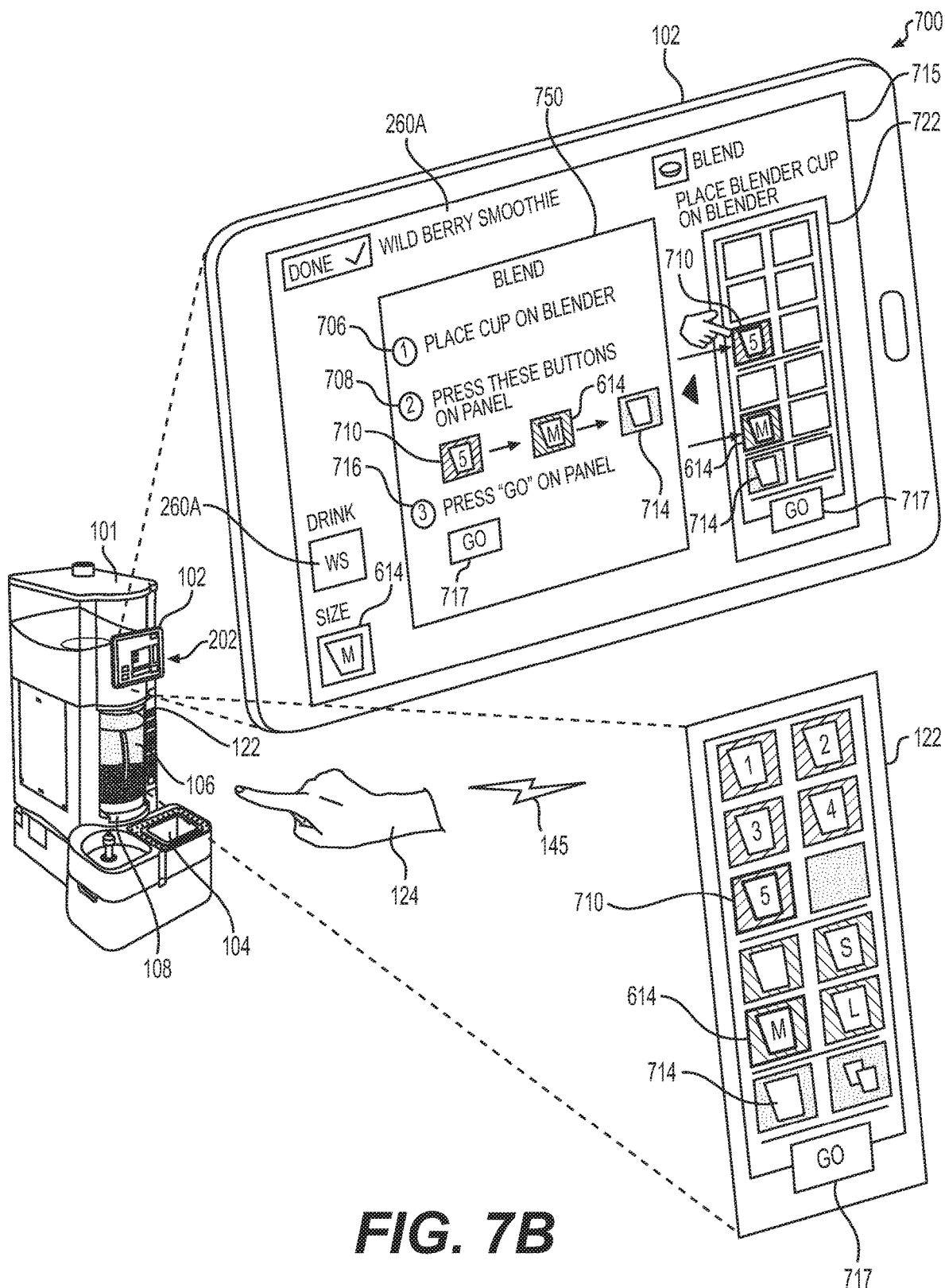
Figure 7C:
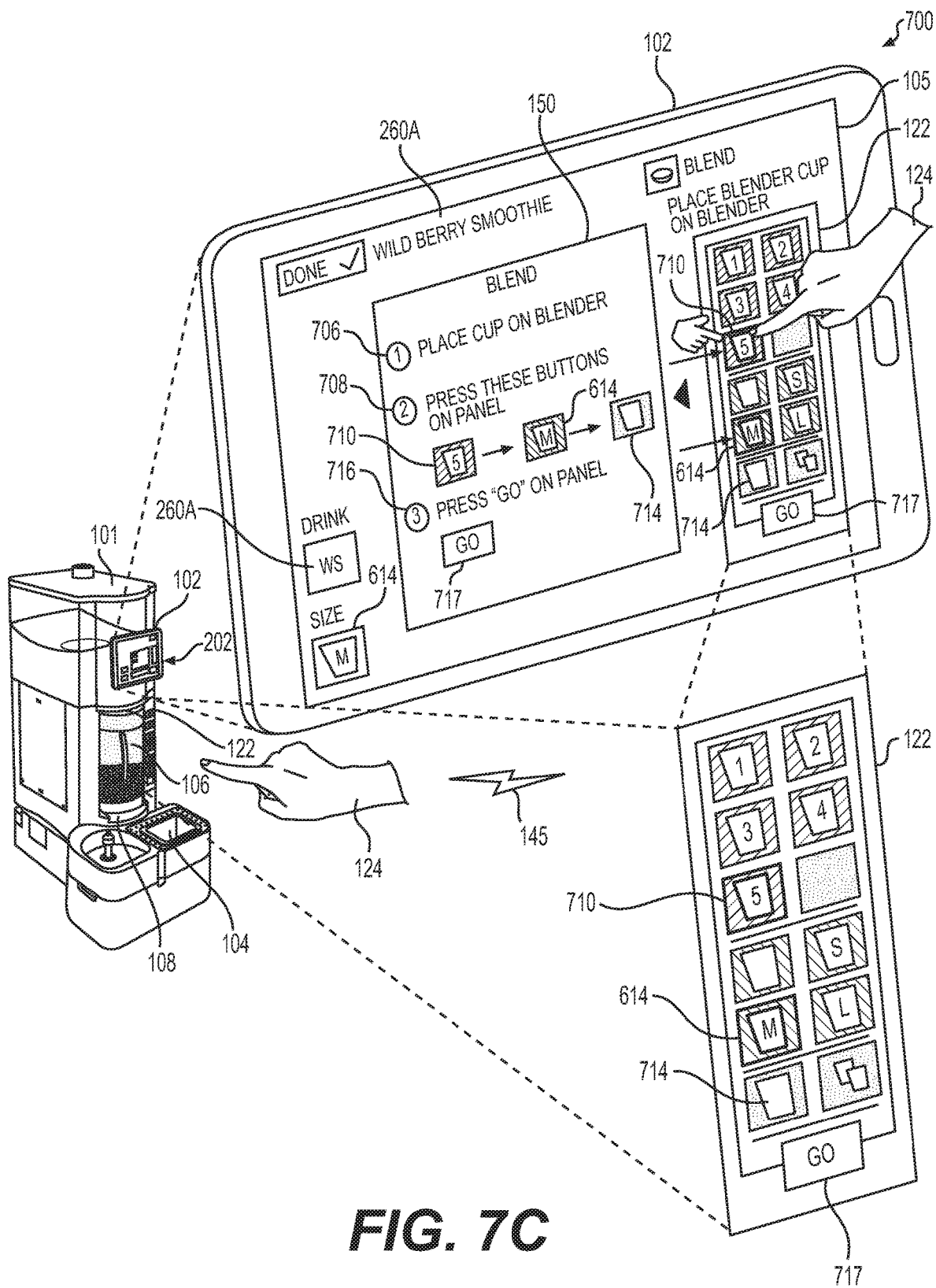

FIGS. 7A-7C are schematic diagrams of an illustrative computing environment of systems and methods 700 usable to provide user interfaces (UIs) 705 in FIG. 7A, 715 in FIG. 7B and 105 in FIG. 7C with a variety of display options for actions in the execution of the recipe 260A. The subject actions in this example occur after ingredients 416 for recipes 260A have been added to a container 106, and the container 106 is moved to the blender 108 portion of an appliance 101. The computing device 102 is operated by a recipe processing application 202 and includes the UIs 705, 715 or 105. The recipe processing application 202 receives the recipe 260A and communicates with the appliance 101 and/or its integrated components of the scale 104 and the blender 108 through network 145. In these examples, the recipe processing app 202 UIs 705, 715 and 105 may present the next recipe action block 750 in FIGS. 7A and 7B or block 150 in FIG. 7C. FIGS. 7A-7C also depict an appliance 101 for processing the recipe 260A, including an integrated scale 104 and blender 108 for the receipt and processing of a container or cup 106 including the ingredients 416 of the recipe 260A.

FIG. 7A presents "blend" instructions in a recipe action block 750 based on the UI 705 presenting one or more indications associated with actions 262 for the recipe 260A. In this example, the blend instructions shown in recipe action block 750 include visual depictions of data entry buttons from the control panel 122, and in this respect, may be considered to incorporate portions of the control panel 122. However, the instructions 750 need not provide a duplication of any portion of the control panel 122. Instead, the instructions may provide a narrative, or another representation, including photographs, videos or any form of data, that may convey to the user 124 information related to operating the appliance 101.

The FIGS. 7A-7C UIs 705, 715 and 105 may add one or more indications associated with one or more portions of an appliance control panel or a full appliance control panel for instructions to support user actions or data entry options. The data associated with the subject appliance, such as appliance 101, scale 104 and/or blender 108, may guide the user's execution of one or more processing steps for the appliances. For example, a recipe action block 750 may include instructions for one or more data entry selections or other data related to processing steps for one or more portions of the appliance control panel. Also, the UIs 705, 715 or 105 may be operable for data entry. For example, an interaction by a user 124 with the UIs 705, 715 or 105 trigger operation of the appliance 101. More particularly, the operability of one or more indications on the 705, 715 or 105, associated with one or more portions of the control panel 122, may function in the same manner as if a user 124 selected the same or related data entry options on the actual control panel 122 located on the appliance 101.

In this manner, where there are multiple appliances, such as a scale 104, a blender 108 or a combination appliance 101, with separate, partially integrated or fully integrated control panels, the UIs 705, 715 or 105 may incorporate multiple portions of multiple control panels, portions of some control panels and full control panels of other appliances when there were multiple appliances. They need not be connected or otherwise associated with each other, such as a separate scale 104 and/or an independent blender 108 that are not integrated nor connected with an appliance 101. In yet further examples, the portions of control panel or the entirety of control panel may be presented solely on the UIs 705, 715 or 105 as a substitution for any control panels on the housing of the appliance(s) themselves. The computing device 102 in this example may enable the user 124 to focus on engaging in all operations of appliances for the preparation of foodstuffs solely through the UIs 705, 715 or 105.

An independent computing device 102 or 252 with display of full control panels also may improve the operation of individual appliances and/or integrated or associated appliances based on eliminating physical interactions with individual appliance control panels. This may avoid wear and tear on the control panels, and/or the hardware or software supporting the control panels. Another basis to improve the operation of individual appliance(s) is to coordinate the next operational step with the completion of the prior step. This processing approach reduces hardware wear and tear and reduces the chance of user errors. Another basis to improve the operation of appliances is for the recipe processing app 202 to analyze data entry related to the operations of a single appliance or as between multiple appliances in order to generate new feedback data. The feedback data may then be applied to improve the recipe 206A, the operations as between appliances and/or future designs of appliances. One example may be that where multiple data entry buttons are consistently selected together, the recipe 260A instruction or even the portion of a control panel related to the data entry buttons may be modified and therefore the recipe 260A execution or appliance may be updated to improve operations. As another example, despite providing instructions, a consistent user data entry error may generate data feedback to support modifying, reducing, or combining instructions and/or data entry on UIs 705 or 105 to reduce errors. These improvements in the operation of appliances may be accelerated based on including control panels solely on independent UIs that are supported by a recipe processing app 202. The recipe processing app 202 may also interact with the appliances to continue to assess the data entry and provide feedback, particularly where the recipe processing app 202 may integrate data from multiple appliances.

More particularly, in FIG. 7A, a recipe action block 750 includes three instructions labeled (1) 706, (2) 708 and (3) 716. An instruction (1) 706 is to "place the cup on the blender." Instruction (2) 708 is to "press these buttons on the panel." The "panel" referenced in this instruction of recipe action block 750 is the appliance control panel 122 of the appliance 101 shown on the appliance 101 in this FIG. 7A. There is no additional display option on the UI 705 of this example of the appliance 101 control panel 122. An instruction (2) 708 may also include an indication of three buttons to press sequentially, namely button 710 with a "5" indicated on the button (for example, for a blender speed), button 614 with a "M" indicated on the button (for example, for the size of the foodstuff being prepared) and button 714 (for example, for the addition of ice to the blender as it processes the ingredients 416 of the recipe 260A). Finally, an instruction (3) 716 is to activate a button 717 or the "go" switch. In this example, one or more indications on the UI 705 are solely for instructional purposes. As shown in FIGS. 7B and 7C, the UIs 715 and 105 are operable on the computing device 102 to receive data entry in order to operate the appliance 101.

FIG. 7B presents the "blend" instructions in the recipe action block 750, as well as one or more indications associated with the data fields from the appliance 101 control panel 122, as shown in the UI 715 display option 722. In this example, the display 722 presents a generalized depiction of the look and feel of the control panel 122, highlighting those data fields related to the instructions (such as with finger icons). In some examples of the illustrative computing environment 700, portions of the control panel 722 may include only data options that apply to processing the current recipe 260A. As a result, the user 124 (in one example, the employee) may have a reduced number of data entry options. This may serve multiple purposes of associating the instructions with the actual data entry or other data of the appliance 101 control panel 122, including focusing the user 124 on a limited number of specific data fields for the "blend" instructions in block 750. More particularly, the UI 715 may include solely the same four data entry buttons, namely button 710 of panel 122 with a "5" indicated on the button, button 614 of panel 122 with an "M" indicated on the button, button 714 of panel 122 and the button 717 with a "go" indicated on the button. The display option 722 on the UI 715 may also provide further guidance by one or more of a finger, a pointer and/or arrow icons associated with the data fields 710, 614, 714 and 717. In additional examples, the display 722 may include a sequential indication of data entry options 710, 614, 714 and 717 with, for example, an illumination or the icons of each of the data field buttons 710, 614, 714 and 717 as they are the subject of data entry, as well as the next data entry button to be activated, or similar.

FIG. 7C presents the "blend" instructions in recipe action block 150, as well as a display 122 that in this example provides one or more indications as a duplication of the control panel 122 of the appliance 101. The control panel 122 is depicted in FIG. 7C as enlarged for illustration purposes with a dotted line association to both of the appliance 101 and the UI 105. Like the display panel 715 in FIG. 7B, the overlap between the control panel 122 on the UI 105 and the control panel 122 on the appliance 101 supports an objective of associating the instructions with the actual appliance 101 control panel 122. The UI 105 includes all of the data fields of the control panel 122 from the appliance 101. This example also depicts an additional interaction between the control panel 122 on the UI 105 and the appliance 101. The additional interaction is an indication of the receipt of data entry from either the appliance 101 or the UI 105 control panel 122, on both of the control panels 122 presented on the appliance 101 and the UI 105, such as illuminating individual data fields, presenting a blinking function, or displaying other icons. These two-way data indications may be present also on the UI 715 in FIG. 7B as data entry is made on the appliance 101 control panel 122. Providing feedback data on both of the UI 715 display option 722 and the appliance 101 and/or UI 105 control panel 122 may reinforce the operations of the appliance(s) 101, 104 or 108. FIG. 7C also is similar to FIG. 7B in that, while it includes additional data entry fields, it also presents the four data field buttons from the recipe action block 750 as in FIG. 7B. The UI 105 may include the same three data entry buttons, namely button 710 on panel 122 with a "5" indicated on the button, button 614 on panel 122 with an "M" indicated on the button, button 714 on panel 122 and the button 717 on panel 122 with a "go" indicated on the button.

In examples shown in FIGS. 7B-7C, the UIs 715 and 105 also include one or more portions or a full appliance control panel display 122 of the appliance 101 that are operable to receive data entry. In these examples, the control panels 722 or 122 may be used to receive data entry in order to operate the appliance 101, in one example, the blender 108. More particularly, in FIG. 7C, the display option 122 of UI 105, may be operable to receive data entry from the user 124 for a portion of the control panel or the full control panel 122 of the appliance 101. This is shown in FIG. 7C with an illustration of a finger of the user 124 pointing to data entry on both of the control panel 122 on the appliance 101 and the UI 105. Additional examples of the operability of UI 105 to receive data entry for the control panel 122 are now described. The UI 105 may be operable in combination with the appliance 101 control panel 122 data entry. Alternatively, the UI 105 data entry capability may override the appliance 101 control panel 122 so that the user 124 may be limited to providing data input that is actionable to operate the appliance 101 only from the UI 105. Where the control panel 122 of the appliance 101 is disabled, the requirement of direct interaction by the user 124 with the UI 105 may prompt more efficient activity by the user 124.

In other examples, both the UIs 715 and 105 may be operable to receive data entry at the same time. In addition to the visual guidance provided by the one or more indications as shown in recipe action block 750 and 150 and control panels 722 and 122, the recipe processing app 202 UIs 105 and 715 may also provide one or more indications associated with the appliance 101 control panel 122 that is operable to receive data entry from the user 124. By enabling the user 124 to provide data entry on either the recipe ingredient block 750 or 150, or the display 122 of the UIs 105 or 705, the interaction of the user 124 may be supported to occur on the same UI in which the instructions (as shown in the recipe action block 750 and 150) are provided and a duplication of the appliance 101 control panel 122 is depicted. In this manner, the attention of the user 124 is focused on instructions and interactions that most efficiently accomplish operation of the appliance 101. More particularly, in UI 105, portions or all of the recipe action block 150 also may be operable, such as the depictions of data buttons 710, 614 and 714 from within the recipe action block 150, as well as from the control panel 122. In another example, there may be an additional coordination between the recipe action block 150 or 750 and the control panel 122. Examples of this additional coordination include that the control panel 122 is illuminated, blinking or providing another indication associated with data entry, as well as the sequence of data entry. Also, the operability features of the UIs 715 or 105 may be supported by either one-way or two-way communication connections so that data entry on either of the control panels (722 for UI 715 or 122 for UI 105) may be reflected or presented on the control panel 122 of the appliance 101.

The UIs 705, 715 or 105 in additional examples also may include additional guidance for a portion of a control panel or a full control panel of the appliance(s). The additional guidance may be provided as part of the actions 262 in the recipes 260A, based on data provided from another source and/or based on feedback produced during the execution of the recipe 260A. For example, where a portion of a control panel is provided for a blender (for example, in FIG. 7B UI 722 based on the combination appliance 101 control panel 122) and an over pour of an ingredient 416 is detected as feedback, the speed of the blender 108 may be impacted. The feedback may, in this case, prompt a change to the speed of the blender 108 that is presented on the recipe ingredient block 650 and the control panel 722. For example, instead of executing the data associated with the control panel 122 for a blender speed of "5," the feedback about the over pour may result in a change of the blender speed to "4." In this case, recipe ingredient block 650 and control panel 722 may change an instruction to the user 124 to indicate a "4" speed (not shown). Such changes also may be reflected in the full control panel 122 of FIG. 7C.

Figure 8:
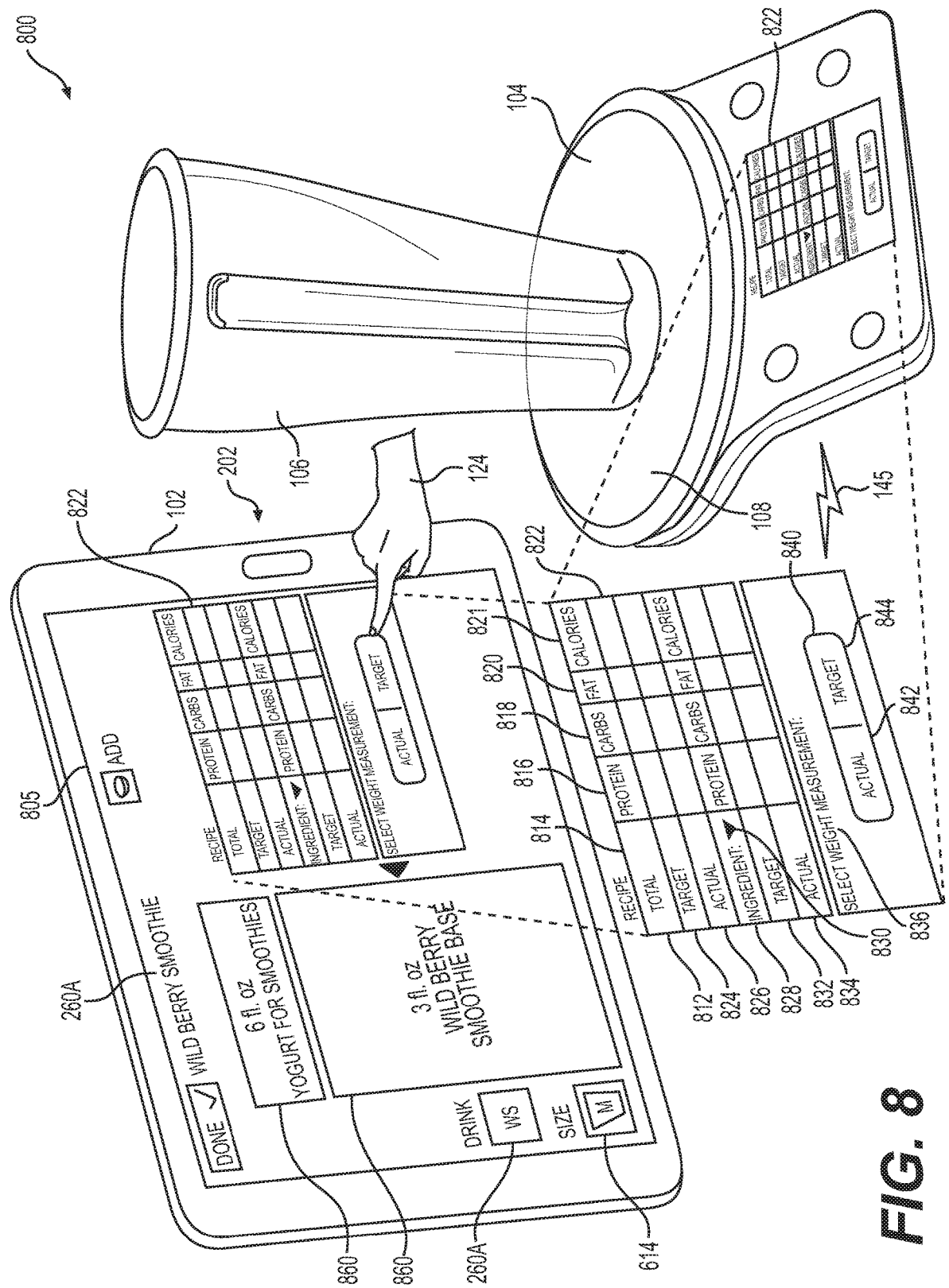
FIG. 8 depicts a schematic diagram of another illustrative example of systems and methods usable to provide a scale as an appliance and a computing device for processing a recipe.

FIG. 8 depicts a schematic diagram of another illustrative example of systems and methods 800 usable to provide a scale 104 as an appliance and a computing device 102 for processing a recipe 260A. The device 102 is associated with the scale 104 through a network 145. The recipe processing app 202 installed on the computing device 102 may be configured to allow a user 124 to access and interact with the scale 104 for executing the recipe 260A using the control panel 822 on either the scale 104 and/or the UI 805. Such interaction may further comprise the recipe processing app 202 generating the UI 805 to include an indication of the recipe 260A; recipe ingredient blocks 860 with an implied action 262 of adding the ingredients 416 to a container 106 for measurement by the scale 104; and, a control panel 822 to operate the scale 104. The control panel 822 as shown is duplicative of the control panel 822 on the housing of the appliance 104 (presented for illustration purposes also as an enlarged control panel 822 that is shown with a dotted line association to both the UI 805 and the scale 104).

The UI 805 generated by the computing device 102 for use in this FIG. 8 example is now further described. The recipe processing app 202 installed on the computing device 102 may be configured to allow a user 124 to access and interact with the scale 104 using the UI 805 control panel 822. In one example, the recipe processing app 202 may be communicatively connected to the scale 104 through the network 145. The UI 805 in this example presents the "WS" Wild Berry smoothie recipe 260A (on the left-hand column as well as the header) and the "M" medium serving size 614 (on the left-hand column). The UI 805 also presents two recipe ingredient blocks 860 for the steps of adding the ingredients 416 to the container 106. The two blocks 860 include an activated first recipe ingredient block 860 of a "3 fl. oz. Wild Berry Smoothie base." The UI 805 may further include additional recipe ingredient blocks 860, such as the recipe ingredient block 860 for "6 fl. oz. Yogurt for Smoothies." Each recipe ingredient block 860 may include an indication of the identity of the ingredient 416 and an indication of the predetermined amount (or weight) to be added, also called a target weight, as specified in the original recipe 260A. Upon executing the recipe 260A (such that the ingredients 416 are measured by the scale 104), as also discussed above, the blocks 860 may also be visually altered to show a weight measurement detected by the scale 104.

In addition, in FIG. 8, each recipe ingredient block 860 may present a target ingredient weight of an ingredient 416. Since it may be impractical or impossible for a user 124 to add a precise amount of a given ingredient, the recipe processing app 202 may also include an associated dead band that defines a lower threshold weight less than the target ingredient weight and an upper threshold weight greater than the target ingredient weight. The lower threshold and the upper threshold may be determined as a percentage of the target ingredient weight, or as an absolute weight difference from the target ingredient weight. The dead band may be symmetric or asymmetric about the target ingredient weight. The dead band may be adjustable by the user 124. Any actual measured weight within the dead band limits, that is, any weight that is greater than or equal to the lower threshold weight and less than or equal to the upper threshold weight, may be considered as equivalent to the target ingredient weight. The dead band may also support the identification of a threshold amount relative to the desired target ingredient weight. A threshold amount may take a variety of forms, including for example, within 1%, 2%, 5%, 10%, 25% or 50% of the target amount (such as weight, volume, density, or similar) of the ingredient 416 called for in the recipe 260A. Upon a determination by the recipe processing app 202 that the subject ingredient of the recipe ingredient block 860 is complete such that the ingredient 416 has been added to a container 106, the UI 805 may further display additional data regarding the actual ingredient weight measurement on the control panel 822. The upper portion of control panel 822 displays a table of data. The first row 812 of the table shows labels for the various columns, which include a first column presenting various data regarding the total recipe or an ingredient of the recipe, and remaining columns showing additional nutritional information for "Protein" 816, "Carbs" 818, "Fat" 820 and "Calories" 821. The next row 824 of table 822 shows the nutritional information based on target ingredient weight, and the subsequent row 826 shows the nutritional information based on actual ingredient weight measurement for the total recipe 260A. The subsequent set of rows includes similar data on an ingredient-by-ingredient 416 basis, with row 828 indicating an ingredient 416, such as the "Wild Berry Smoothie Base" of recipe ingredient block 860, and replicated labels for columns 816, 818, 820, and 821. The next ingredient listed in table 822 may populate automatically, such as in one example, based on the current recipe ingredient block 860, or may populate by a selection by the user 124 of an ingredient 416 from the recipe 260A using the arrow icon 830 which may display a drop-down list of ingredients (not shown). The nutritional values for the selected ingredient are shown in columns 816, 818, 820 and 821 based on the target ingredient weight in row 832 and based on the actual ingredient weight measurement in row 834. In this way, nutritional information for each ingredient, as well as for the total recipe, may be shown at the same time on the control panel 822. The control panel 822 in this example also may include an additional data entry control 840, titled "select weight measurement" 836. This data entry control 840 may include two data entry selections of the actual ingredient weight measurement 842, titled "actual," and the target ingredient weight 844, titled "target." In one example, the user 124 may select one of the data entry options on the control panel 822 on either of the UI 805 or the scale 104.

In this case, the UI 805 control panel 822 is operable to receive data entry from the user 124. In another example, the UI 805 display 822 may indicate a selection from a data entry made only on the control panel 822 of the scale 104, rather than the control panel 822 presented on the UI 805. The UI 805, therefore, may display the data entry control 840 for illustration purposes only, with the operable data entry point being the control panel 822 of the scale 104. The recipe processing app 202 may then receive the data entry from the scale 104 through the communication connection using network 145. This example is shown in FIG. 4B based on the data shown in row 442 that the UI control panel operability 434 for the scale 104 is "instruction only."

In yet another example, the UI 805 may substitute the UI 805 control panel 822 shown in FIG. 8 with an instruction to select from between the actual and target weights 842 and 844, respectively, on the control panel 822 of the appliance 104 (not shown). The instruction may be in the form of a recipe action block 850 so that the UI 805 may include both recipe ingredient block(s) 860 and recipe action block(s) simultaneously (not shown). In this manner, with the scale 104 as an appliance in communication with the processor of the computing device 102, the recipe processing app 202 may provide a UI 805 with actions 262, and ingredients related to the recipe 260A. The actions 262 may include: one or more of recipe ingredient blocks 860 with ingredients and an implied instruction to add these ingredients to a container 106 for measurement by the scale 104; and, one or more recipe action blocks 850 to process the ingredients 416. The UI 805 may further include one or more indications associated with a portion of the control panel 822 of the scale 104, such as one or more data entry fields on the control panel 822 of the scale 104. In this example, one indication may be a data entry option to select between the actual and target weights 842 and 844, respectively.

What is claimed is:

1. A system, comprising:
a computing device having at least one processor, at least one user interface and a memory, the memory including computer-executable instructions that, when executed by the processor, cause the at least one processor to:
receive a recipe, the recipe indicating at least two ingredients and at least one action;
receive an identification of an appliance and appliance data, the appliance data including at least one data field of a control panel of the appliance, the at least one action associated with the data field of the control panel of the appliance;
render, on the user interface, a first indication associated with the at least one action and the data field of the control panel of the appliance, wherein the first indication is operable on the user interface to receive a data entry, the data entry is associated with an operation of the appliance, the action is an instruction to perform the data entry on the first indication; and
receive the data entry for the first indication; and transmit the data entry to the appliance.

2. The system of claim 1, wherein the recipe further indicating the identification of the appliance.

3. The system of claim 1, wherein the identification of the appliance is based, at least in part, on a detection by the processor of the appliance.

4. The system of claim 1, wherein the data field of the control panel of the appliance is a depiction of at least a portion of the control panel of the appliance.

5. The system of claim 4, wherein the appliance data further includes a depiction of a plurality of data fields of the control panel of the appliance and the action further associated with at least two of the plurality of data fields of the control panel of the appliance and wherein the computer-executable instructions further cause the processor to:
render, on the user interface, the first indication further associated with the action and the depiction of the plurality of data fields of the control panel of the appliance.

6. The system of claim 1, wherein the processor and the memory are internal components of the appliance.

7. The system of claim 1, wherein the action is an instruction to perform at least one data entry on the data field of the control panel of the appliance.

8. The system of claim 7, wherein the first indication associated with the data field of the control panel of the appliance is not operable on the user interface to receive a data entry, and wherein the computer-executable instructions further cause the processor to:
receive a second indication that the operation of the appliance associated with the data field is completed; and
render, on the user interface, a third indication associated with a completion of the action.

9. The system of claim 1, wherein the action further including a plurality of instructions for operating the appliance, and the appliance data further including a plurality of data fields and at least one of the plurality of instructions being associated with at least one of the plurality of data fields, and wherein the computer-executable instructions further cause the processor to:
for each of the plurality of instructions, render, on the user interface, another indication associated with the one of the plurality of instructions and the associated one of the plurality of data fields.

10. A system comprising:
a computing device having at least one processor, at least one user interface and a memory; and
the memory including computer-executable instructions that, when executed by the processor, cause the processor to:
receive a recipe, the recipe indicating at least two ingredients and at least one action;
receive an identification of an appliance;
receive appliance data, the appliance data associated with the appliance and indicating that at least a portion of the operation of the appliance is user operated, the at least one action associated with at least one instruction for operation of the appliance;
render, on the user interface, a first indication associated with the action;
receive second indication that the operation of the appliance based on the action is completed;
render, on the user interface, a third indication associated with a completion of the action, wherein the first indication is operable on the user interface to receive a data entry, the data entry is associated with an operation of the appliance, the action is an instruction to perform the data entry on the first indication; and
receive the data entry for the first indication; and transmit the data entry to the appliance.

11. The system of claim 10, wherein the recipe further indicating the identification of the appliance.

12. The system of claim 10, wherein the identification of the appliance is based, at least in part, on a detection by the processor of the appliance.

13. The system of claim 10, wherein the appliance data further includes a depiction of a data field of the control panel of the appliance and the action further associated with the data field of the control panel.

14. The system of claim 13, wherein the appliance data further includes a depiction of a plurality of data fields of the control panel of the appliance and the action further associated with at least two of the plurality of data fields of the control panel of the appliance and wherein the computer-executable instructions further cause the processor to:
render, on the user interface, the first indication further associated with the depiction of the plurality of data fields of the control panel of the appliance.

15. The system of claim 10, wherein the processor and the memory are internal components of the appliance.

16. The system of claim 10, wherein the action is an instruction to perform at least one data entry on the data field of the control panel of the appliance.

* * * * *